US012776892B2

(12) United States Patent
Franck et al.

(10) Patent No.: US 12,776,892 B2
(45) Date of Patent: Oct. 27, 2026

(54) JITTER CORRECTION IN A RECEIVER DEVICE

(71) Applicant: Mellanox Technologies, Ltd., Yokneam (IL)

(72) Inventors: Thorkild Franck, Roskilde (DK); Johan Jacob Mohr, Copenhagen (DK)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 18/905,974

(22) Filed: Oct. 3, 2024

(65) Prior Publication Data

US 2026/0100812 A1 Apr. 9, 2026

(51) Int. Cl.
*H04L 7/00* (2006.01)
*H04B 1/10* (2006.01)
*H04L 25/03* (2006.01)

(52) U.S. Cl.
CPC ......... *H04L 7/0033* (2013.01); *H04B 1/1027* (2013.01); *H04L 25/03057* (2013.01)

(58) Field of Classification Search
CPC .. H04B 1/0007; H04B 1/0014; H04B 1/0028; H04B 1/0039; H04B 1/10; H04B 1/1027; H04L 7/0033; H04L 7/0041; H04L 25/03006; H04L 25/03057
USPC ....... 375/233, 326, 343, 345, 348, 362, 371, 375/375; 370/516, 517; 455/232.1, 455/234.1, 234.2, 250.1; 713/503, 600
See application file for complete search history.

(56) References Cited

U.S. PATENT DOCUMENTS 6,967,694 B1 * 11/2005 Ninomiya .............. H04H 40/27 375/355
7,127,019 B2 * 10/2006 Koslov ............... H04L 27/2662 375/346
8,254,514 B1 * 8/2012 Zhang .................. H04B 1/7085 375/150
2001/0006500 A1 * 7/2001 Nakajima .............. G11B 7/126 369/59.19
2003/0161235 A1 8/2003 Baba
2008/0191746 A1 8/2008 Friedman et al.
2008/0192640 A1 * 8/2008 Simpson ................. H04L 1/241 370/249
2021/0336761 A1 * 10/2021 Smith ............... H04L 25/03146
2022/0329247 A1 10/2022 Van Ierssel et al.
2023/0421349 A1 12/2023 Mohr

* cited by examiner

*Primary Examiner* — Young T. Tse
(74) *Attorney, Agent, or Firm* — Lowenstein Sandler LLP

(57) ABSTRACT

Technologies for jitter extraction are described. A receiver device includes an analog-to-digital converter (ADC) and a signal processing circuit. The signal processing circuit includes an equalizer block, a phase detector block, and a jitter correction block. The jitter correction block can receive current data from the equalizer block, determine a running sum value based on phase information received from the phase detector block, apply either a first gain value or a second gain value to the running sum value to obtain a phase correction value based on a sign of the running sum value, wherein the first gain value and the second gain value are different, and re-sample, using the phase correction value, the current data to obtain re-sampled data to reduce jitter in the current data.

22 Claims, 24 Drawing Sheets

330

340

JITTER CORRECTION IN A RECEIVER DEVICE

TECHNICAL FIELD

At least one embodiment pertains to processing resources used to perform and facilitate network communication. For example, at least one embodiment pertains to jitter correction in a receiver device.

BACKGROUND

Communications systems transmit and receive signals at a high data rate (e.g., up to 200 Gbits/sec). High-speed transmissions exhibit significant noise attributes (e.g., due to the transmission medium or from oscillators) that require the use of communication devices (e.g., transmitters and receivers) configured to perform digital pre-processing by the transmitter device and post-processing by the receiver device. High-speed data transmission in data centers and between computing and storage devices is often achieved without transmitting a data clock. This implies that the receiving device includes a clock-recovery circuit that recovers a data clock used to transmit the data. A conventional clock-recovery circuit includes a phase detector for controlling a receiver sampling clock in a closed-loop fashion. There can be clock jitter in the transmitter clock signal (called "transmitter clock jitter"). Transmitter clock jitter is a deviation of a clock edge from an ideal edge location. The conventional clock-recovery circuit performs error averaging in a feedback loop to reduce transmitter clock jitter. Due to a delay in the feedback loop of the clock-recovery circuit and the need for averaging, the feedback loop bandwidth should be limited to avoid amplification of the transmitter clock jitter above the loop bandwidth. However, limiting the loop bandwidth leaves some of the transmitter clock jitter untracked, referred to as "untracked sampling jitter." Untracked sampling jitter can be a major error contributor, limiting the achievable raw Bit Error Rate (BER) of the high-speed data transmission.

BRIEF DESCRIPTION OF DRAWINGS

Various embodiments in accordance with the present disclosure will be described with reference to the drawings, in which.

DETAILED DESCRIPTION

Figure 1A:
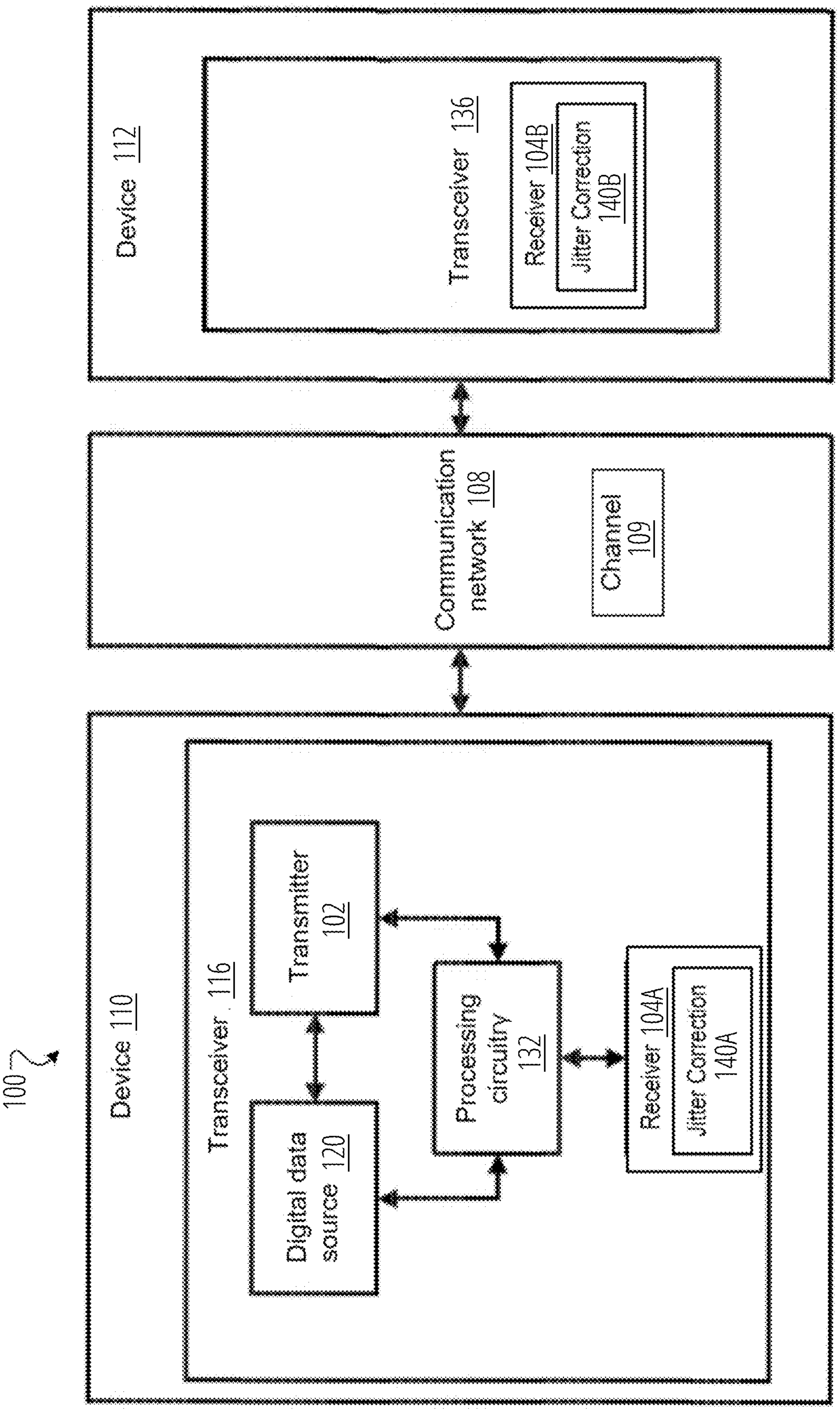
FIG. 1A illustrates an example communication system with a jitter correction block, in accordance with at least some embodiments.

Technologies for jitter extraction are described. The following description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely exemplary. Particular implementations may vary from these exemplary details and still be contemplated to be within the scope of the present disclosure.

As described above, a feedback loop of a clock-recovery circuit has a limited loop bandwidth that can leave untracked sampling jitter, which may be a major contributor to the BER of the high-speed transmission. To address these and other challenges, U.S. Patent Publication No. US 2023/0421349, commonly assigned to the Applicant, describes a jitter extraction technique (JITX) that improves data resampling. JITX re-samples the current data to obtain re-sampled data based on the sampling offset to reduce jitter in the current data. In particular, the jitter correction block can reduce jitter based on a sampling offset (e.g., phase offset) in a feedforward manner. The JITX can provide a combination of a closed-loop tracking and open-loop compensation of sampling jitter. The combination of closed-loop tracking and open-loop compensation can allow higher bandwidth or better filtering of phase offsets (phase detector output) for feedforward correction than closed-loop tracking alone. In some implementations, only one phase detector can be used, improving hardware efficiency. In other implementations, a second or augmented phase detector can be used to improve feedforward correction independently of closed-loop tracking.

Aspects and embodiments of the present disclosure provide various enhancements to the feedforward phase correction, including at least: 1) phase adjustments for an asymmetric eye shape, which is common in optical signals; 2) static adjustments of a sampling point; and 3) adaptations of the gain, as described herein in more detail. In various embodiments, a receiver device can include an analog-to-digital converter (ADC) to sample incoming signals and obtain samples. This ADC is coupled with a signal processing circuit that comprises an equalizer block, a phase detector block, and a jitter correction block. The jitter correction block receives data from the equalizer block and determines a running sum value (also referred to as "cumulative sum") based on phase information obtained from the phase detector block. It then applies either one of two different gain values to this running sum in order to derive a phase correction value, which is determined by the sign of the running sum. The jitter correction block subsequently re-samples the current data using the derived phase correction value to produce re-sampled data that eliminates jitter effects from the original signal samples.

Aspects and embodiments of the present disclosure can provide a clock recovery (CR) block with a timing error detector (TED) to measure a sampling offset. The sampling offset can be used to control the sampling of subsequent data by an analog-to-digital converter (ADC) in a feedback manner. The same sampling offset can also be used to re-sample the current data based on the sampling offset. Aspects and embodiments of the present disclosure can provide a jitter extraction or jitter correction block with a filter coupled to the output of the TED and a re-sample block. The filter can filter the sampling offset at a frequency greater than a frequency of the loop bandwidth of the CR block. The filter can be a running average using a special case of a finite impulse response (FIR) filter. The re-sample block can include an interpolation function, an FIR filter, or a multi-tap FIR filter (e.g., a three-tap FIR filter, a five-tap FIR filter, or longer).

Aspects and embodiments of the present disclosure can improve sampling eyes for symbol detection by re-sampling a data signal based on the sampling offset to extract jitter from the data signal. By re-sampling the data signal based on the sampling offset, aspects and embodiments of the present disclosure can reduce residual jitter before a decision block, e.g., a symbol detector (e.g., a maximum likelihood sequence estimate (MLSE) block). By re-sampling the data signal based on the sampling offset, aspects and embodiments of the present disclosure can provide additional equalization after jitter extraction.

FIG. 1A illustrates an example communication system 100 with a jitter correction block 140, in accordance with at least some embodiments. The system 100 includes a device 110, a communication network 108 including a communication channel 109, and a device 112. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices also connected to a common type of communication network 108. According to embodiments, the receiver 104A, 104B of devices 110 or 112 may correspond to a graphics processing unit (GPU), a switch (e.g., a high-speed network switch), a network adapter, a central processing unit (CPU), a data processing unit (DPU), etc. As another specific but non-limiting example, the devices 110 and 112 may correspond to servers offering information resources, services and/or applications to user devices, client devices, or other hosts in the system 100.

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In other embodiments, the communication network 108 can be a Peripheral Component Interconnect Express (PCIe) interconnect. PCIe is a high-speed interface standard used to connect various hardware components. It can be an interconnect for devices such as graphics cards (GPUs), solid-state drives (SSDs), network cards, and other peripherals. PCIe offers a scalable, high-speed, and point-to-point connection between devices, including CPUs, GPUs, memory, and the like. In other embodiments, the communication network 108 can be a high-speed interconnect, such as an interconnect that deploys the NVLink technology. The NVLink interconnect can be a GPU-GPU interconnect used between GPUs, a CPU-GPU interconnect between GPUs and CPUs, or an interconnect used between other devices. NVLink offers a higher bandwidth and lower latency than traditional PCIe connections, which are typically used in computing hardware. NVLink is especially useful in scenarios that require massive parallel processing, such as artificial intelligence (AI), machine learning, deep learning, high-performance computing (HPC), and data analytics. For example, in NVIDIA's DGX systems and high-end gaming or AI workstations, NVLink helps GPUs exchange data at speeds that are necessary for demanding tasks like real-time ray tracing or training neural networks. In one specific, but non-limiting example, the communication network 108 is a network that enables data transmission between the devices 110 and 112 using data signals (e.g., digital, optical, wireless signals). The embodiments described herein can be utilized in a system with a high-speed, scalable switch, such as a switch using the NVSwitch technology. NVSwitch is a high-speed, scalable switch developed by NVIDIA that facilitates data communication between multiple GPUs in a system, allowing them to work together more efficiently by providing high-bandwidth, low-latency interconnections. The NVSwitch serves as a central hub or high-bandwidth fabric that interconnects all the GPUs in a system, enabling each GPU to communicate with every other GPU quickly and efficiently. The NVSwitch can be coupled between other types of devices, such as CPUs, accelerators, memory, or the like. The NVSwitch can be used for tasks requiring intense computation and collaboration between multiple GPUs, such as AI model training, scientific simulations, and large-scale data processing. The embodiments described herein can be used in a high-performance computing system, such as a computing system modeled after NVIDIA's DGX systems, which are designed specifically for artificial intelligence (AI), deep learning, and high-performance computing (HPC) workloads. DGX systems are optimized for large-scale GPU computation and parallel processing, integrating multiple GPUs, high-bandwidth interconnects, and software frameworks tailored for AI and HPC tasks. In at least one embodiment, a system for high-speed network communication includes a processing unit, a network interface comprising a receiver or transceiver with the jitter correction block, as described herein. The processing unit can include a CPU, a GPU, a DPU, a network adapter, a network switch, an NVLink switch, or the like.

The device 110 includes a transceiver 116 for sending and receiving signals, for example, data signals. The data signals may be digital or optical signals modulated with data or other suitable signals for carrying data.

The transceiver 116 may include a digital data source 120, a transmitter 102, a receiver 104A, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 102 includes suitable software and/or hardware for receiving digital data from the digital data source 120 and outputting data signals according to the digital data for transmission over the communication network 108 to a receiver 104B of device 112.

The receiver 104A, 104B of device 110 and device 112 may include suitable hardware and/or software for receiving signals, for example, data signals from the communication network 108. For example, the receivers 104A, 104B may include components for receiving and processing signals to extract the data for storing in a memory. In at least one embodiment, the receiver 104B includes a jitter correction block 140B. In another embodiment, the receiver 104A also includes a jitter correction block 140A. The receiver 104B receives an incoming signal and samples the incoming signal to generate samples, such as using an ADC. The ADC can be controlled by a clock-recovery circuit (or clock recovery block) in a closed-loop tracking scheme. The clock-recovery circuit can include a phase detector (or a TED) that can measure a phase offset of the samples. The phase offset is also referred to as a sampling offset. The clock-recovery circuit can include a controlled oscillator, such as a voltage-controlled oscillator (VCO) or a digitally-controlled oscillator (DCO) that controls the sampling of the subsequent data by the ADC. The clock-recovery circuit can use other closed-loop tracking schemes to determine a sampling offset or phase offset. The jitter correction block 140B can use the phase offset (or sampling offset), measured by the phase detector (or a separate phase detector), to re-sample the current data to obtain re-sampled data in an open-loop compensation scheme. The re-sampling of the current data reduces jitter in the current data. The jitter correction block 140B can be considered to be extracting or reducing the jitter in the signal or cleaning the signal from the jitter. Additional details of the jitter correction block are discussed in more detail below with reference to the figures. In addition, FIG. 6C-FIG. 6D, and FIG. 7A-FIG. 8B illustrate some enhancements to the feedforward jitter correction circuit, including the 1) phase adjustments for an asymmetric eye shape, which is common in optical signals; 2) static adjustments of a sampling point; and 3) adaptations of the gain, as described herein in more detail.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application specific integrated circuit (ASIC). Other non-limiting examples of the processing circuitry 132 include an Integrated Circuit (IC) chip, a CPU, A GPU, a DPU, a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 136 may include other processing devices, storage devices, and/or communication interfaces generally associated with computing tasks, such as sending and receiving data.

Figure 1B:
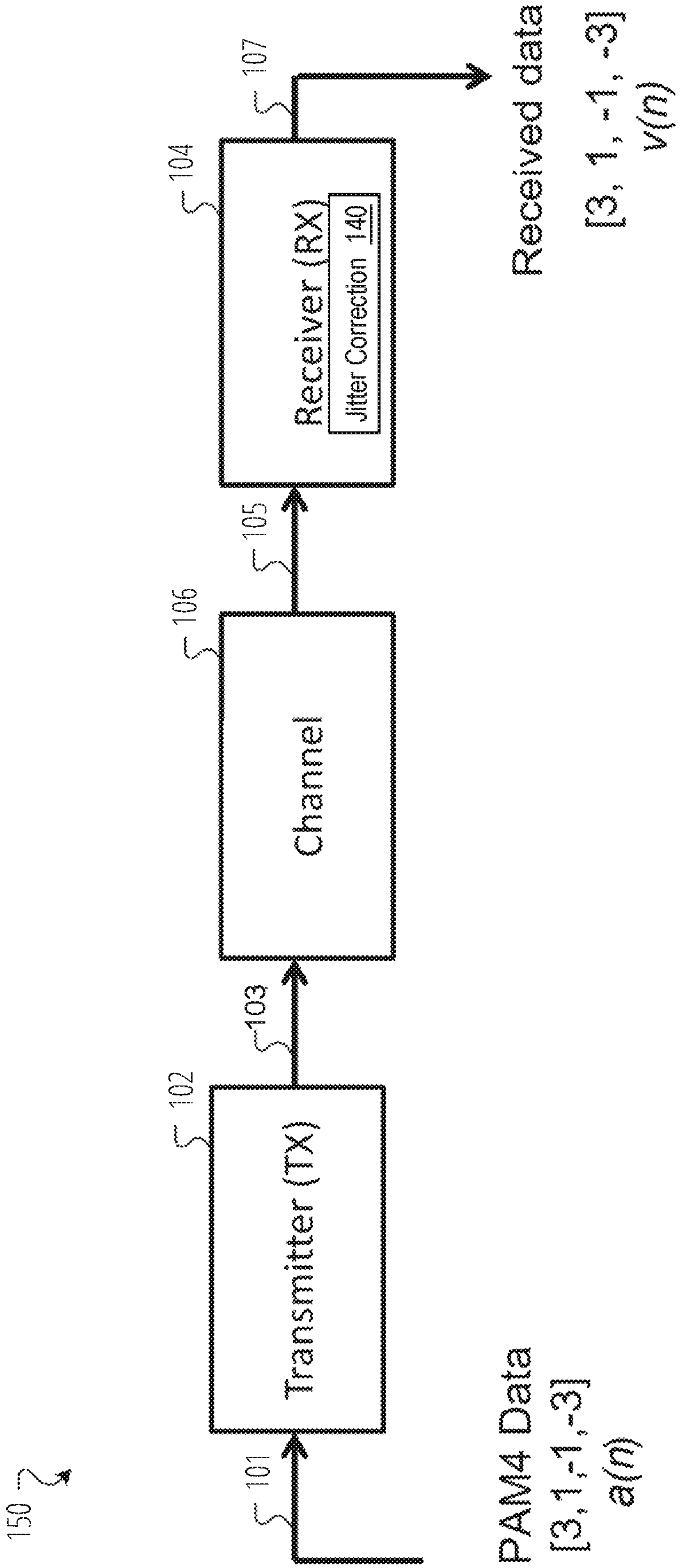
FIG. 1B is a block diagram of a communication system employing a jitter correction block in a receiver device, according to at least one embodiment.

FIG. 1B illustrates a block diagram of an example communication system 150 employing a jitter correction block 140 in a receiver 104, according to at least one embodiment. In the example shown in FIG. 1B, a PAM level-4 (PAM4) modulation scheme is employed with respect to the transmission of a signal (e.g., digitally encoded data) from a transmitter (TX) 102 to a receiver (RX) 104 via a communication channel 106 (e.g., a transmission medium). In this example, the transmitter 102 receives 101 an input data (i.e., the input data at time n is represented as "a(n)"), which is modulated in accordance with a modulation scheme (e.g., PAM4) and sends the signal 103 a(n) including a set of data symbols (e.g., symbols −3, −1, 1, 3, wherein the symbols represent coded binary data). It is noted that while the use of the PAM4 modulation scheme is described herein by way of example, other data modulation schemes can be used in accordance with embodiments of the present disclosure, including for example, a non-return-to-zero (NRZ) modulation scheme, PAM7, PAM8, PAM16, etc. For example, for an NRZ-based system, the transmitted data symbols consist of symbols −1 and 1, with each symbol value representing a binary bit. This is also known as a PAM level-2 or PAM2 system as there are 2 unique values of transmitted symbols. Typically, a binary bit 0 is encoded as −1, and a binary bit 1 is encoded as 1 as the PAM2 values.

In the example shown, the PAM4 modulation scheme uses four (4) unique values of transmitted symbols to achieve higher efficiency and performance. The four levels are denoted by symbol values −3, −1, 1, 3, with each symbol representing a corresponding unique combination of binary bits (e.g., 00, 01, 10, 11).

The communication channel 106 is a destructive medium in that the channel acts as a low pass filter which attenuates higher frequencies more than it attenuates lower frequencies, introduces inter-symbol interference (ISI) and noise from cross talk, from power supplies, from Electromagnetic Interference (EMI), or from other sources. The communication channel 106 can be over serial links (e.g., a cable, printed circuit boards (PCBs) traces, copper cables, optical fibers, or the like), read channels for data storage (e.g., hard disk, flash solid-state drives (SSDs), high-speed serial links, deep space satellite communication channels, applications, or the like.

As described above, in some communication systems, the transmitter 102 sends the signal 103 as a data signal without a transmitter clock used to generate the data signal. The receiver (RX) 104 receives an incoming signal 105 over the communication channel 106. The incoming signal 105 can be degraded and attenuated by the communication channel 106 and can include noise. The incoming signal 105 can be affected by the transmitter clock jitter. The jitter correction block 140 can be used to compensate for the transmitter clock jitter as described herein. The jitter correction block 140 can compensate for the jitter before additional equalization and symbol detector logic in the receiver 104. The receiver 104 can output a received signal 107, "v(n)," including the set of data symbols (e.g., symbols −3, −1, 1, 3, wherein the symbols represent coded binary data). In at least one embodiment, the jitter correction block 140 can use phase detector information for closed-loop clock recovery and feedforward open-loop jitter correction to compensate for the residual untracked high-frequency jitter. Additional details of the jitter correction block 140 are discussed in more detail below with respect to FIG. 2. In addition, FIG. 6C-FIG. 6D, and FIG. 7A-FIG. 8B illustrate some enhancements to the feedforward jitter correction circuit, including the 1) phase adjustments for an asymmetric eye shape, which is common in optical signals; 2) static adjustments of a sampling point; and 3) adaptations of the gain, as described herein in more detail.

Figure 2:
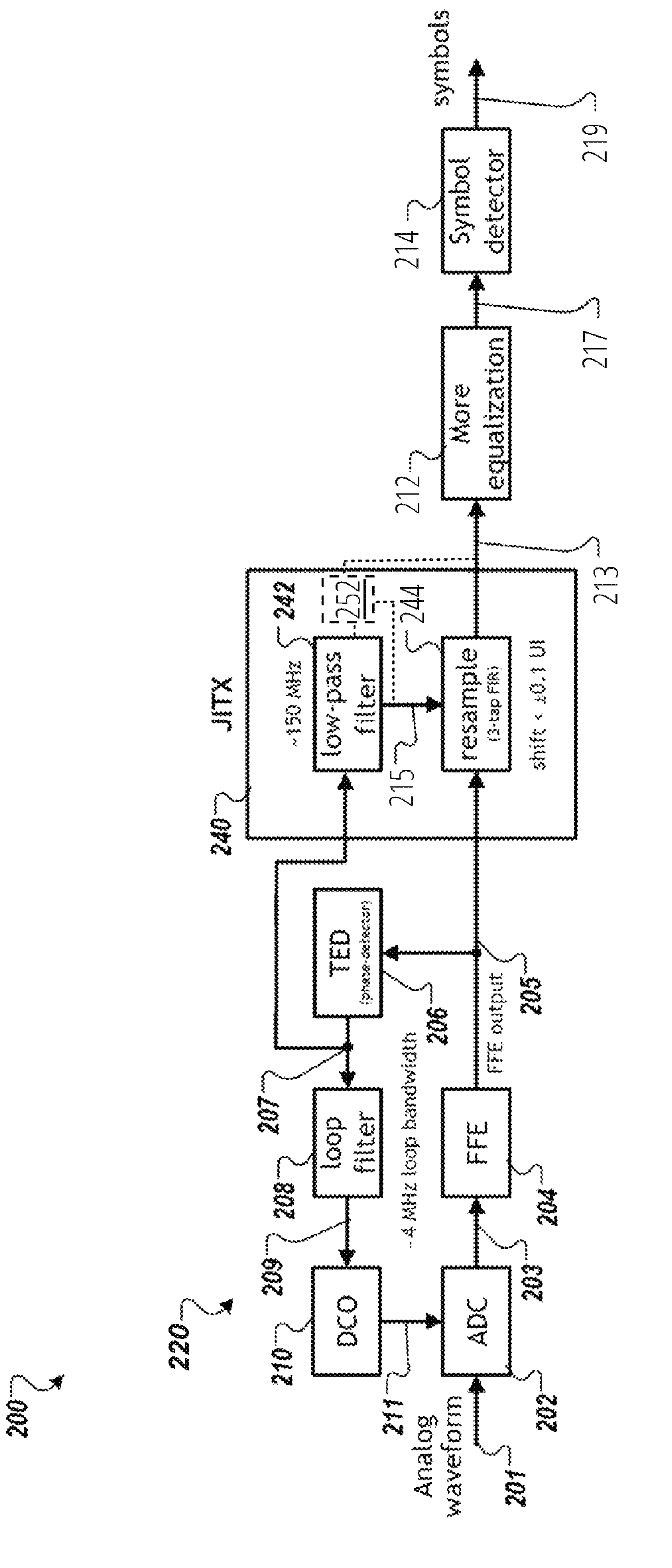
FIG. 2 is a block diagram of a receiver with a jitter extraction and correction block, according to at least one embodiment.

FIG. 2 is a block diagram of a receiver 200 with a jitter extraction and jitter correction block 240 with a gain controller 252, according to at least one embodiment. The receiver 200 includes an ADC 202 and a digital signal processing circuit 220, including one or more digital processing blocks. In the illustrated embodiment, the digital signal processing circuit 220 includes an equalizer block 204, a timing error detector TED 206, a loop filter 208, a controlled oscillator 210 (e.g., DCO, VCO, or the like), the jitter extraction and jitter correction block 240, an optional equalization block 212, and a symbol detector 214.

The ADC 202 receives an incoming signal 201. The incoming signal 201 can be analog. The ADC 202 samples the incoming signal 201 and generates samples 203. The equalizer block 204 receives the samples 203 and generates an equalized output 205 (or a reduced bandwidth signal for, e.g., a DFE or a MLSE). The equalized output 205 can be an equalized signal. In at least one embodiment, the equalizer block 204 is a feedforward equalizer (FFE) block that generates an FFE output. In another embodiment, the equalizer block 204 includes a Continuous-Time Linear Equalizer (CTLE) and an FFE. In another embodiment, the equalizer block 204 includes only the CTLE or only the FFE. In another embodiment, other types of equalizer blocks can be used. The digital signal processing circuit 220 can include a clock recovery (CR) block with TED 206. In another embodiment, the digital signal processing circuit 220 includes a clock and data recovery (CDR) block with TED 206. In other embodiments, a phase detector (PD) block is used instead of TED 206, as described herein.

The TED 206 measures a sampling offset 207 at the equalized output 205 FFE output). In another embodiment, the TED 206 measures a phase offset or other phase information of the equalized output 205. For example, the sampling offset 207 can be a phase offset of current data. The sampling offset 207 (or the phase offset or phase information), measured by TED 206, can be used to control sampling by the ADC 202. In particular, the sampling offset 207 can be filtered by the loop filter 208 to generate a filtered sampling offset 209. The controlled oscillator 210 receives the filtered sampling offset 209 and generates a control signal 211 to control the sampling by the ADC 202. The control signal 211 can be a sampling clock of the ADC 202. The CR block can be part of a clock recovery loop in at least one embodiment. The clock recovery loop can be a closed-loop feedback loop. The CR block can include TED 206, a loop filter 208, and a controlled oscillator 210. The CR block uses the measurements by TED 206 to control the controlled oscillator 210 for sampling future data (future FFE data). In another embodiment, the CR block or the clock recovery loop can include other additional components or can be organized in other configurations. In at least one embodiment, the controlled oscillator 210 is a DCO. In another embodiment, the controlled oscillator 210 is a VCO. In at least one embodiment, the CR block can operate at a loop bandwidth of a first frequency to track the jitter. That is, the CR block can track and reduce jitter less than the first frequency (low-frequency below the loop bandwidth) using the phase timing variation measured by TED 206. As described above, the jitter above the loop bandwidth is untracked. In at least one embodiment, the loop bandwidth is approximately 4 MHz. Alternatively, the loop bandwidth can be other frequencies. The controlled oscillator 210 can have higher phase noise than desired. One remedy is to increase the loop bandwidth in the clock recovery loop. However, the total loop delay makes it difficult to increase the clock recovery loop bandwidth without getting peaking in the jitter transfer. The TED 206 can be a type of phase detector (PD) that generates valid phase information about the jitter, but the phase information cannot be used in the clock recovery loop due to the loop delay. The control of the controlled oscillator 210 can be additionally delayed due to the loop delay. A first slicer can be used right after the equalizer block 204. The first slicer can conduct preliminary data decoding after the equalization. The decoded data and the errors, combined in the same place, are used for clock recovery. A second slicer (e.g., symbol detector 214) can decode the data after additional equalization block 212. The final decisions here are not used for clock recovery. In at least one embodiment, the jitter extraction and jitter correction block 240 can use the unused (residual) information from the TED 206 (phase detector) to correct data at the symbol detector 214 (e.g., a final slicer, a Decision Feed-Back Equalizer (DFE), a Maximum Likelihood Sequence Estimator (MLSE), or other optimal or approximate decision algorithms). This should allow the use of phase data in a bandwidth independent of the clock recovery loop delay since the phase data is only fed forward to the signal after the CR block. The CR block will thus take care of the low-frequency (below the loop bandwidth) phase timing variations, followed by a timing correction before final symbol detection by symbol detector 214 (e.g., final slicing by a DFE or an MLSE).

In at least one embodiment, the equalizer block 204 receives the samples 203 and outputs current data based on the samples. The CR block, including the TED 206, can measure the sampling offset 207 of the current data to control the sampling of subsequent data by the ADC 202. The jitter extraction and jitter correction block 240 can receive the current data, and the sampling offset 207 corresponds to the current data. The jitter extraction and jitter correction block 240 uses measurements by the TED 206 to re-sample the current data (current FFE data) to obtain re-sampled data 213 based on the sampling offset 207 to remove jitter in the current data. In another embodiment, the jitter extraction and jitter correction block 240 can be placed later in the equalizer chain.

In at least one embodiment, the jitter extraction and jitter correction block 240 can include a filter 242 (e.g., a low-pass filter) that takes the output from the TED 206 and makes a best estimate of the timing error at the time and forgets the phase information that is corrected by the CR block with a delay. In some cases, this can be considered a lowpass filtering of the phase delay estimates. In at least one embodiment, the filter 242 filters the sampling offset 207 to obtain a filtered sampling offset 215. In at least one embodiment, the filter 242 is an FIR filter. In another embodiment, the filter 242 is a running average block. The running average block can be a special case of an FIR filter.

In at least one embodiment, the jitter extraction and jitter correction block 240 includes a re-sample block 244. The re-sample block can re-sample the current data to obtain re-sampled data 213 using the filtered sampling offset 215. In at least one embodiment, to apply the correction, an anti-symmetric multi-tap FFE (e.g., c=[−k, 1, +k]) can be applied to the current data before the symbol detector 214 (e.g., MSLE). This timing correction works particularly well in a reduced bandwidth receiver (less aliasing) employing a DFE and MLSE or similarly. In at least one embodiment, the filter 242 can operate at a second frequency greater than the first frequency of the clock recovery loop. For example, the second frequency can be approximately 150 MHz. Alternatively, the second frequency can be other frequencies.

In at least one embodiment, the re-sample block 244 can include an interpolation function. In at least one embodiment, the re-sample block 244 can include an FIR filter. In at least one embodiment, the FIR filter is a multi-tap FIR filter, such as a 3-tap FIR filter, a 5-tap FIR filter, or other FIR filters with additional taps. In at least one embodiment, the jitter extraction and jitter correction block 240 includes a delay element coupled between the output of the equalizer block 204 and the re-sample block 244. In at least one embodiment, the delay element can delay the current data to align the current data with the sampling offset 207 (phase-offset value) corresponding to the current data.

In at least one embodiment, the jitter correction block 240 includes an estimator block to determine an average phase offset over a specified time by multiplying a measurement of an instantaneous phase offset during a number of clock cycles by a first parameter value to obtain a running sum. In at least one embodiment, the jitter correction block 240 includes a phase detector gain block to determine a phase-offset value based on the running sum average phase offset value. The jitter correction block 240 includes a delay block to delay the current data to align the current data with the phase-offset value corresponding to the current data. The re-sample block re-samples the current data using the phase-offset value to obtain the re-sampled data 213.

In at least one embodiment, the digital signal processing circuit 220 further includes an additional equalization block 212 to further equalize the re-sampled data 213 to obtain equalized data 217 fed into the symbol detector 214. In at least one embodiment, the symbol detector 214 is a slicer. In another embodiment, the symbol detector 214 includes an MLSE block. The symbol detector 214 outputs the symbols 219.

In at least one embodiment, the gain controller 252 can include one or more jitter correction enhancements, including 1) phase adjustments for an asymmetric eye shape; 2) static adjustments of a sampling point; and 3) gain adaptations.

In at least one embodiment, for the first enhancement 1), the gain controller 252 of the jitter correction block 240, which are part of a single processing circuit coupled to an ADC, can receive current data (e.g., equalized output 205) from an equalizer block of the digital signal processing circuit 220 (e.g., an FFE block or a DFE block). The gain controller 252 can determine a running sum value based on phase information (e.g., sampling offset 207) received from the phase detector block (e.g., TED 206). The gain controller 252 can apply either a first gain value or a second gain value to the running sum value to obtain a phase correction value based on a sign of the running sum value. The first gain value and the second gain value are different. Alternatively, the first gain value and the second gain value can be the same. The first gain value and the second gain value can be relative to a common gain value, e.g., found by adaptive circuitry. The re-sample block 244 can use the phase correction value to re-sample the current data to obtain re-sampled data 213 to reduce jitter in the current data of the equalized output 205. As described herein the re-sample block 244 can be a multi-tap FIR filter, an interpolation block implementing an interpolation function, or the like.

In at least one embodiment, the gain controller 252 includes a running sum block to determine the running sum value based on the phase information received from the phase detector block, and a gain control block to receive the running sum value, determine the sign of the running sum value, select either the first gain value or the second gain value based on the sign, and apply either the first gain value or the second gain value selected to the running sum value to obtain the phase correction value. The re-sample block 244 can receive the current data from the equalizer block, re-sample, using the phase correction value, the current data to obtain the re-sampled data to reduce jitter in the current data.

In at least one embodiment, the jitter correction block 240 includes a second filter 242 coupled to the output of the TED 206 and the gain controller 252. The filter 242 includes a running sum block to receive the sampling offset as the phase information from the TED and determine the running sum value based on the sampling offset, and a gain control block to receive the running sum value, determine the sign of the running sum value, select either the first gain value or the second gain value based on the sign, and apply either the first gain value or the second gain value selected to the running sum value to obtain the phase correction value. The re-sample block 244 is coupled to the second filter 242 and the output of the equalizer block (e.g., 204). The re-sample block 244 can re-sample the current data to obtain the re-sampled data using the phase correction value.

In at least one embodiment, the jitter correction block 240 includes a delay element coupled between the equalizer block and the re-sample block 244 to align the phase correction value with the corresponding current data. When the equalizer block is an FFE block, the delay element can receive an FFE output from the FFE block and provide a delayed FFE output to the re-sample block 244.

In at least one embodiment, as illustrated in FIG. 2, the signal processing circuit also include an additional equalization block 212 coupled to the jitter correction block 240. The signal processing circuit can also include a symbol detector 214 coupled to the additional equalization block 212.

In at least one embodiment, for the second enhancement 2), the gain controller 252 can add a static offset value or a semi-static offset value to the phase correction value before the re-sample block 244 re-samples the current data. For example, an offset value can be updated periodically, such as based on some software algorithm, hence the offset value is a semi-static offset value. In at least one embodiment, the gain controller 252 includes an offset control block to add a static offset value or a semi-static offset value to the phase correction value to obtain a modified phase correction value. The re-sample block 244 can use the modified phase correction value to re-sample the current data to obtain the re-sampled data 213.

In at least one embodiment, the jitter correction block 240 includes a delay element coupled between the equalizer block and the re-sample block 244 to align the phase correction value with the corresponding current data. The offset control block can add a static or semi-static offset value to the phase correction value to obtain a modified phase correction value. The re-sample block 244 can use the modified phase correction value to re-sample the current data to obtain the re-sampled data 213.

The first enhancement 1) and second enhancement 2) are described in more detail below with respect to FIG. 6C, FIG. 7A, and FIG. 10.

In at least one embodiment, for the third enhancement 3), the receiver device includes an ADC to sample an incoming signal to obtain samples, and a signal processing circuit coupled to the ADC. The signal processing circuit includes the jitter correction block 240 with the gain controller 252, and an equalizer block (e.g., 204) to generate current data and a first phase detector (e.g., TED 206) to determine first phase information based on the current data. The jitter correction block 240 can include a gain control block with a second phase detector block to determine second phase information based on re-sampled data from the jitter correction block 240. The gain control block can determine a first running sum value based on the first phase information, determine a second running sum value based on the second phase information, determine a correlation metric between the first running sum value and the second running sum value, and adjust a variable gain setting of the jitter correction block from a first gain value to a second gain value based on the correlation metric. In at least one embodiment, the second gain value is higher than the first gain value responsive to the correlation metric being a positive number indicating a correlation between the first running sum value and the second running sum value. The second gain value is lower than the first gain value responsive to the correlation metric being a negative number indicating a de-correlation between the first running sum value and the second running sum value. The second gain value is equal to the first gain value responsive to the correlation metric being zero indicating an optimum gain setting.

In at least one embodiment, the gain control block can determine the correlation metric as an accumulated product (F) of the first running sum value and the second running sum value. The gain control block can include a delay element to align the first running sum value and the second running sum value before determining the accumulated product. In at least one embodiment, the gain control block includes an integrator with a slope parameter and a bleeder parameter. The integrator can determine the second gain value using the following Equation 1:

$$g_{n+1} = g_n + \alpha * C_n - \beta,$$

where $g_{n+1}$ represents the second gain value, $g_n$ represents the first gain value, α represents the slope parameter, β represents the bleeder parameter, and $C_n$ represents a product of the first running sum value and the second running sum value.

In at least one embodiment, the gain control block can include an error calculator block to receive the re-sampled data and generate error information. The second phase detector block can determine the second phase information using the error information.

In at least one embodiment, the jitter correction block 240 can receive the current data from the equalizer block (e.g., 204) and determine a third running sum value based on the first phase information received from the first phase detector block. The jitter correction block 240 can apply the first gain value to the third running sum value to obtain a phase correction value, and the re-sample block 244 can re-sample, using the phase correction value, the current data to obtain the re-sampled data to reduce jitter in the current data. The jitter correction block, after adjusting the variable gain setting from the first gain value to the second gain value, can receive subsequent data from the equalizer block. The jitter correction block 240 can determine a fourth running sum value based on third phase information received from the first phase detector block. The jitter correction block 240 can apply the second gain value to the fourth running sum value to obtain a second phase correction value. The re-sample block 244 can re-sample, using the second phase correction value, the subsequent data to obtain the re-sampled subsequent data.

The third enhancement 3) is described in more detail below with respect to FIG. 6D, FIG. 8A, and FIG. 11.

Figure 3A:
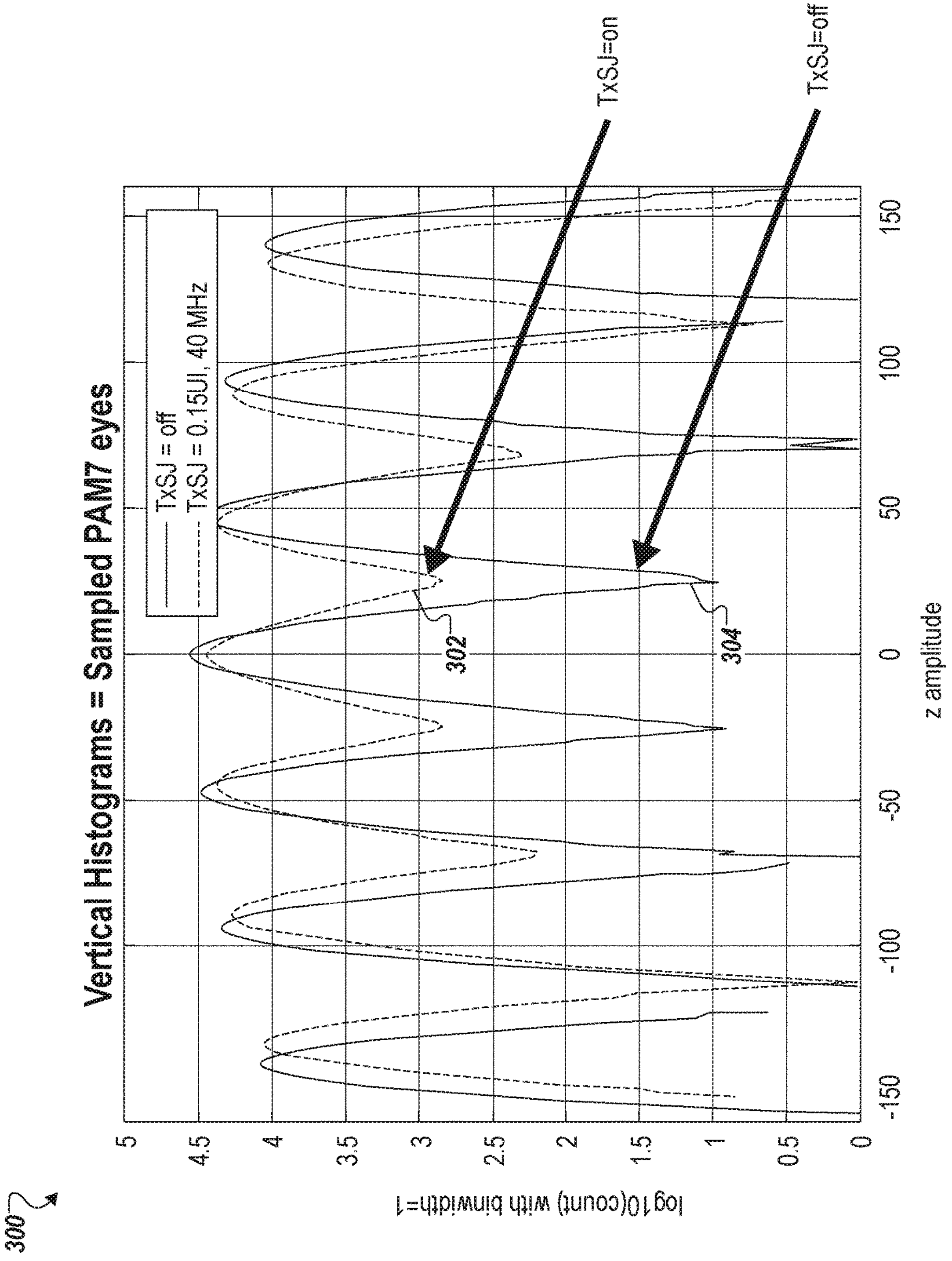
FIG. 3A is a graph of vertical histograms of simulated low-bandwidth sampled PAM7 eyes with sampling jitter and without sampling jitter, according to at least one embodiment.

FIG. 3A is a graph 300 of vertical histograms of simulated low-bandwidth sampled PAM7 eyes with sampling jitter and without sampling jitter, according to at least one embodiment. Graph 300 illustrates seven vertical histograms (log 10(count) of 2,016,000 symbols with a bin width of 1). In this example, an equalizer block (FFE block) output is measured with and without sinusoidal transmit jitter above the clock recovery (CR) loop frequency. In this example, the sinusoidal jitter is 0.15 unit interval (UI) at 40 MHz. As illustrated in FIG. 3A, the sampling jitter above the loop bandwidth closes the sampled PAM7 eye, as shown with a first signal 302 representing the equalizer output with sinusoidal transmit jitter and a second signal 304 representing the equalizer output without. The sampled PAM7 eyes close due to sampling jitter and untracked jitter from the CR block.

FIG. 3B to FIG. 3G are graphs 310-370 of vertical histograms of sampled PAM7 eyes of an output of the equalizer block and an output of the jitter correction block, according to at least one embodiment. As described above, the jitter correction block can reduce the sinusoidal jitter above the loop bandwidth of the CR block up to a certain frequency determined by system noise and configuration of the jitter correction block.

Figure 3B:
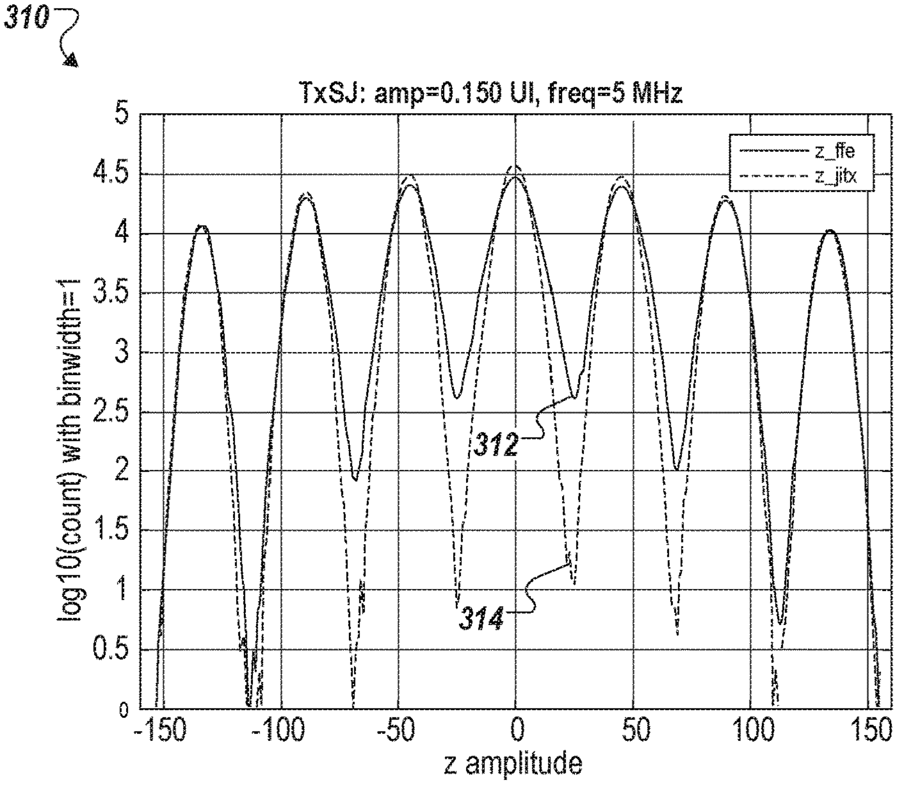
FIG. 3B to FIG. 3G are graphs of vertical histograms of sampled PAM7 eyes of an output of the equalizer block and an output of the jitter correction block, according to at least one embodiment.

In FIG. 3B, graph 310 illustrates a first signal 312 at an output of the equalizer block and a second signal 314 at an output of the jitter correction block. In this example, the sinusoidal jitter is 0.150 UI at 5 MHz. As illustrated in graph 310, the jitter correction block opens the sampled PAM7 eyes.

Figure 3C:
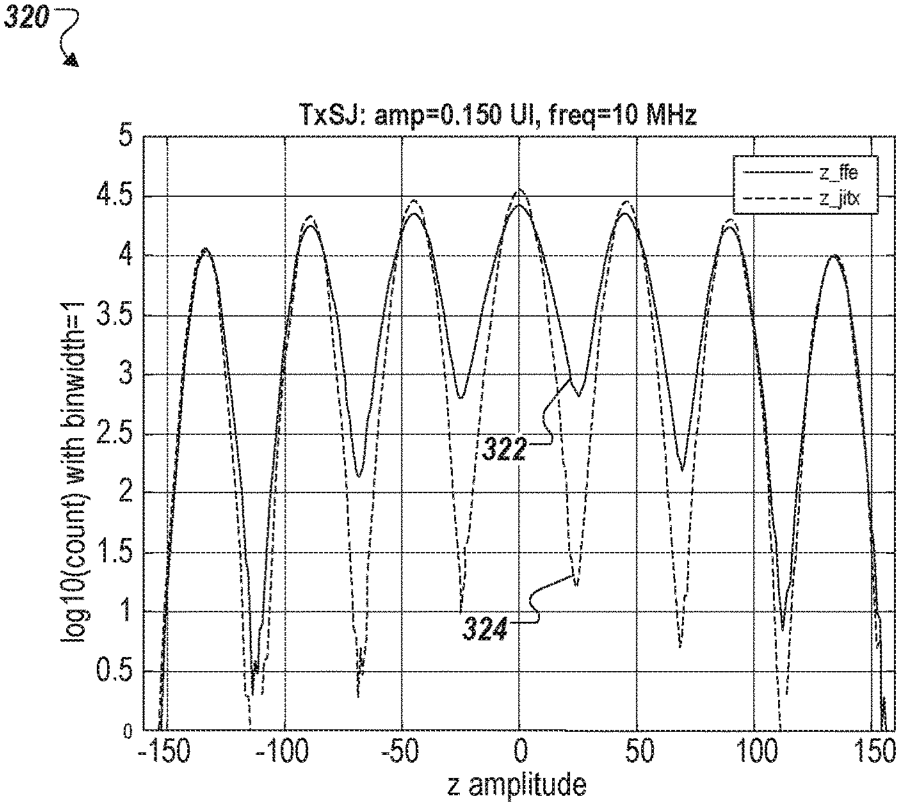

In FIG. 3C, graph 320 illustrates a first signal 322 at an output of the equalizer block and a second signal 324 at an output of the jitter correction block. In this example, the sinusoidal jitter is 0.150 UI at 10 MHz. As illustrated in graph 320, the jitter correction block opens the sampled PAM7 eyes.

Figure 3D:
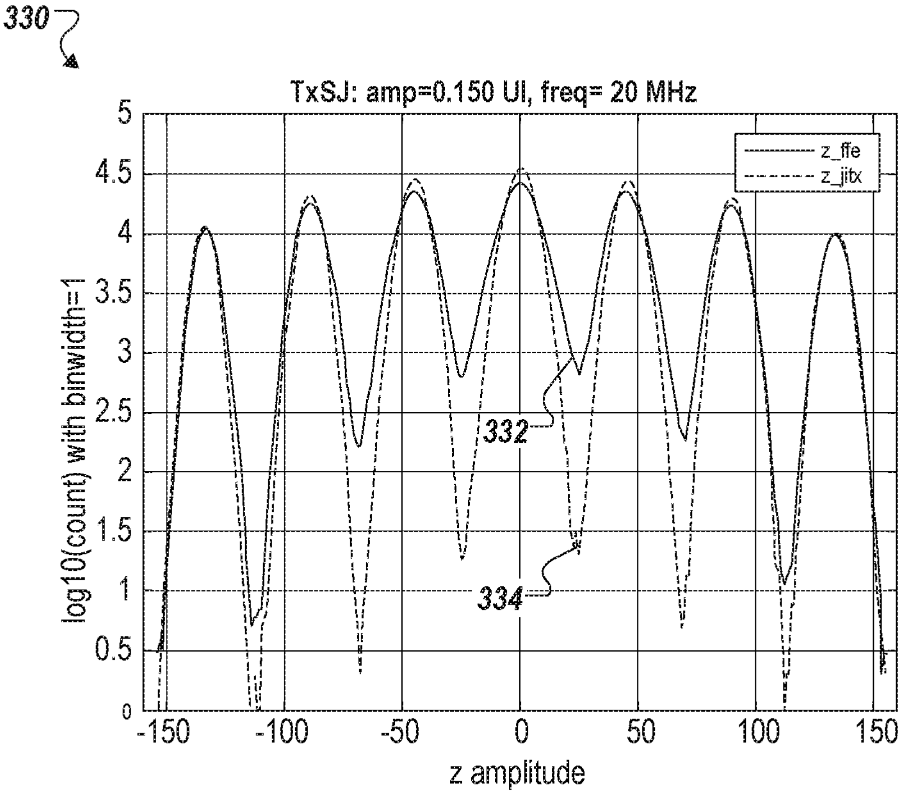

In FIG. 3D, graph 330 illustrates a first signal 332 at an output of the equalizer block and a second signal 334 at an output of the jitter correction block. In this example, the sinusoidal jitter is 0.150 UI at 20 MHz. As illustrated in graph 330, the jitter correction block opens the sampled PAM7 eyes.

Figure 3E:
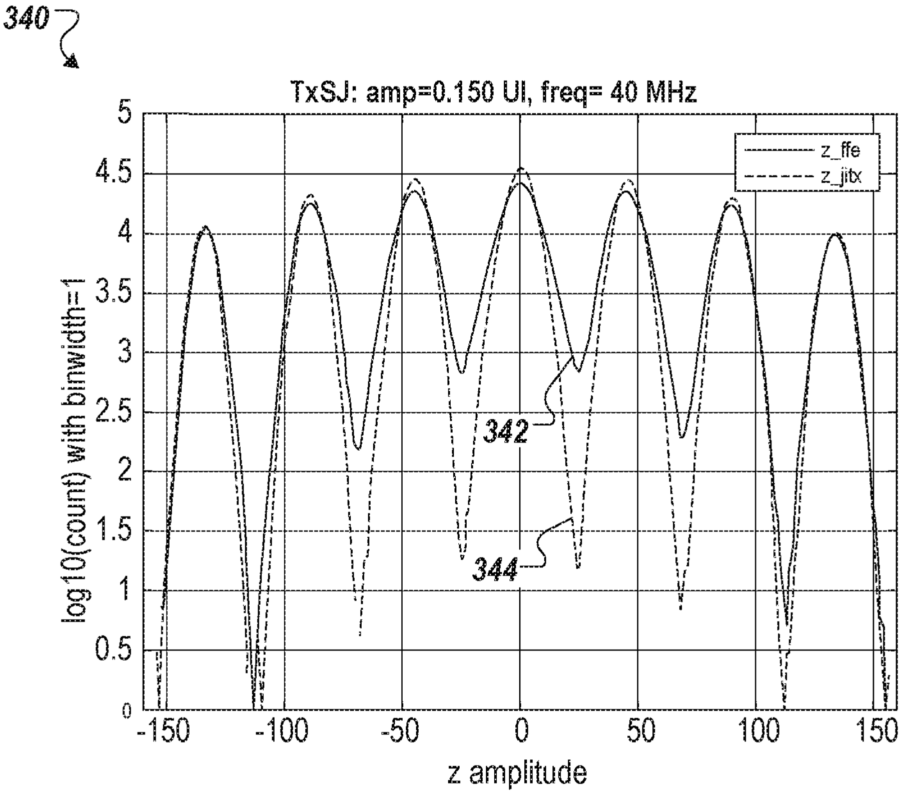

In FIG. 3E, graph 340 illustrates a first signal 342 at an output of the equalizer block and a second signal 344 at an output of the jitter correction block. In this example, the sinusoidal jitter is 0.150 UI at 40 MHz. As illustrated in graph 340, the jitter correction block opens the sampled PAM7 eyes.

Figure 3F:
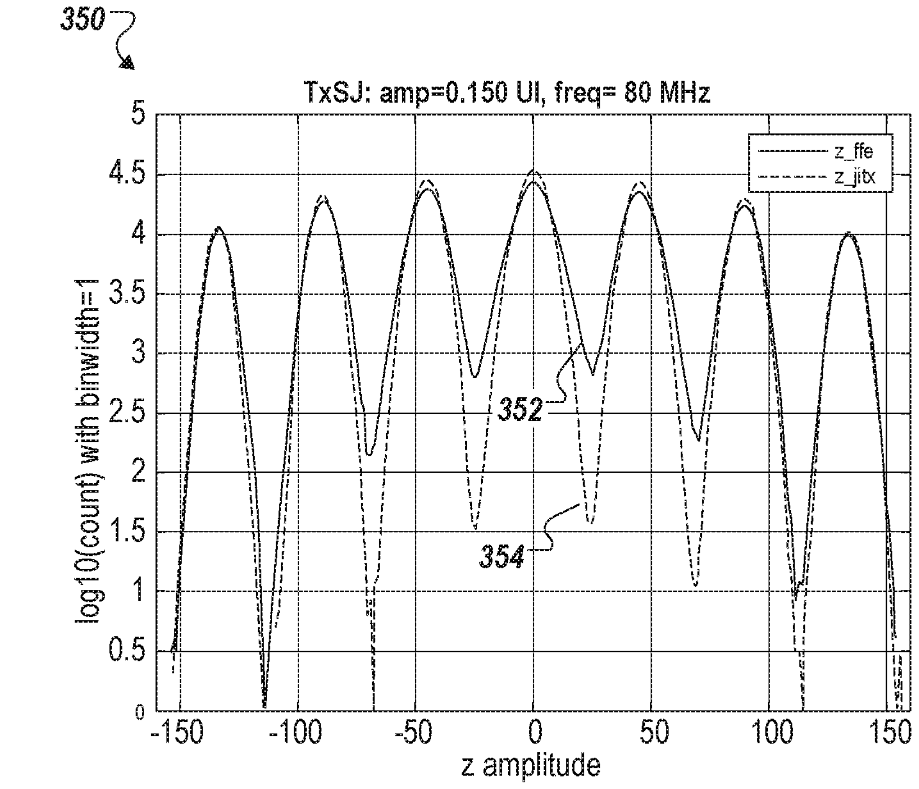

In FIG. 3F, graph 350 illustrates a first signal 352 at an output of the equalizer block and a second signal 354 at an output of the jitter correction block. In this example, the sinusoidal jitter is 0.150 UI at 80 MHz. As illustrated in graph 350, the jitter correction block opens the sampled PAM7 eyes.

Figure 3G:
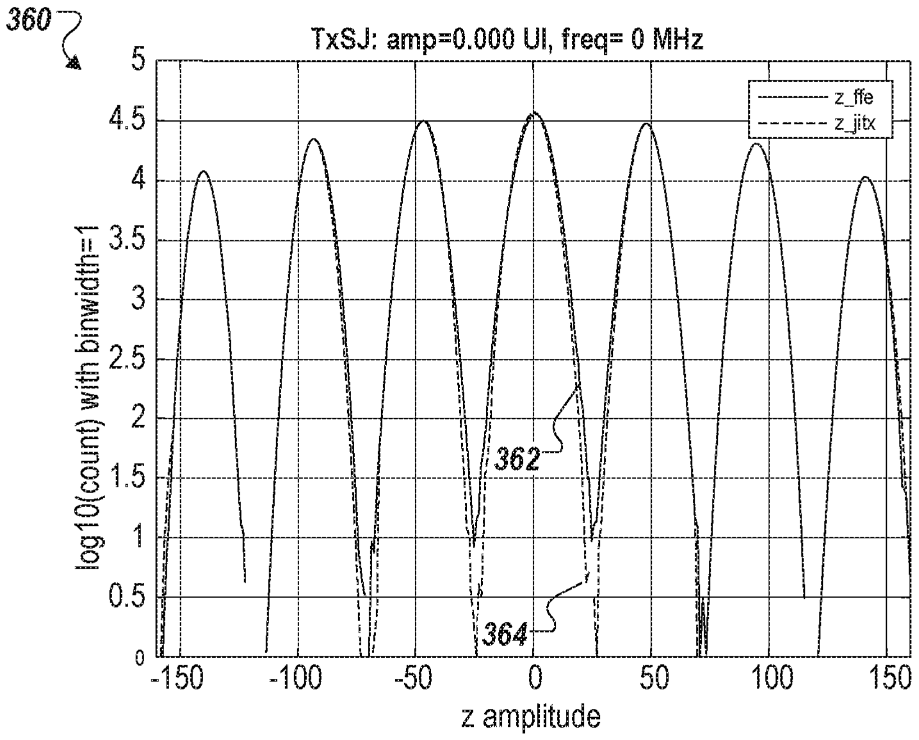

In FIG. 3G, the graph 360 illustrates a first signal 362 at an output of the equalizer block and a second signal 364 at an output of the jitter correction block. In this example, the sinusoidal jitter is turned off (e.g., 0.000 UI at 0 MHz). As illustrated in graph 360, the jitter correction block opens the sampled PAM7 eyes. The eye opening after the jitter correction block is due to tracking of the colored random transmitter and receiver jitter above the clock recovery loop bandwidth from both the transmitter and the receiver. This jitter is present in all simulated signals used for FIG. 3A to FIG. 3G, but its magnitude is for illustration purposes chosen to be fairly small.

As illustrated and described above with respect to FIG. 3B to FIG. 3G, the opening in the vertical sampled PAM7 eyes is significant, resulting in BER improvements. In some cases, the BER can improve from 1E-4 to 1E-6. Alternatively, other BER improvements can be achieved in other implementations.

Figure 4:
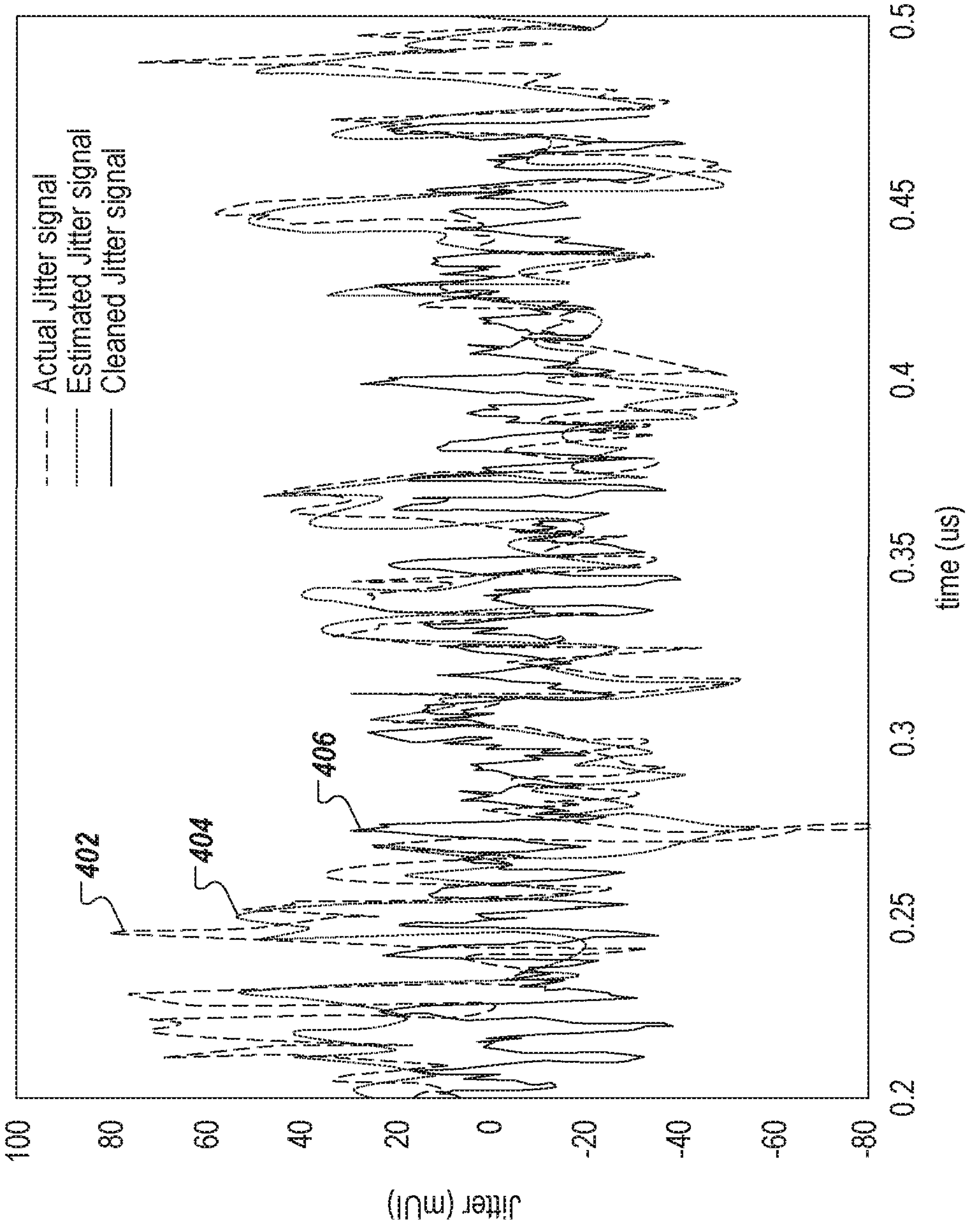
FIG. 4 is a graph illustrating an actual jitter signal, an estimated jitter signal, and a cleaned jitter signal after jitter correction, according to at least one embodiment.

FIG. 4 is a graph 400 illustrating an actual jitter signal 402, an estimated jitter signal 404, and a cleaned jitter signal 406 after jitter correction, according to at least one embodiment. As described above, the jitter correction block can receive the actual jitter signal 402 and estimate the jitter, as shown in the estimated jitter signal 404. Based on the estimate, the jitter correction block can reduce the estimated jitter to generate the cleaned jitter signal 406.

Figure 5:
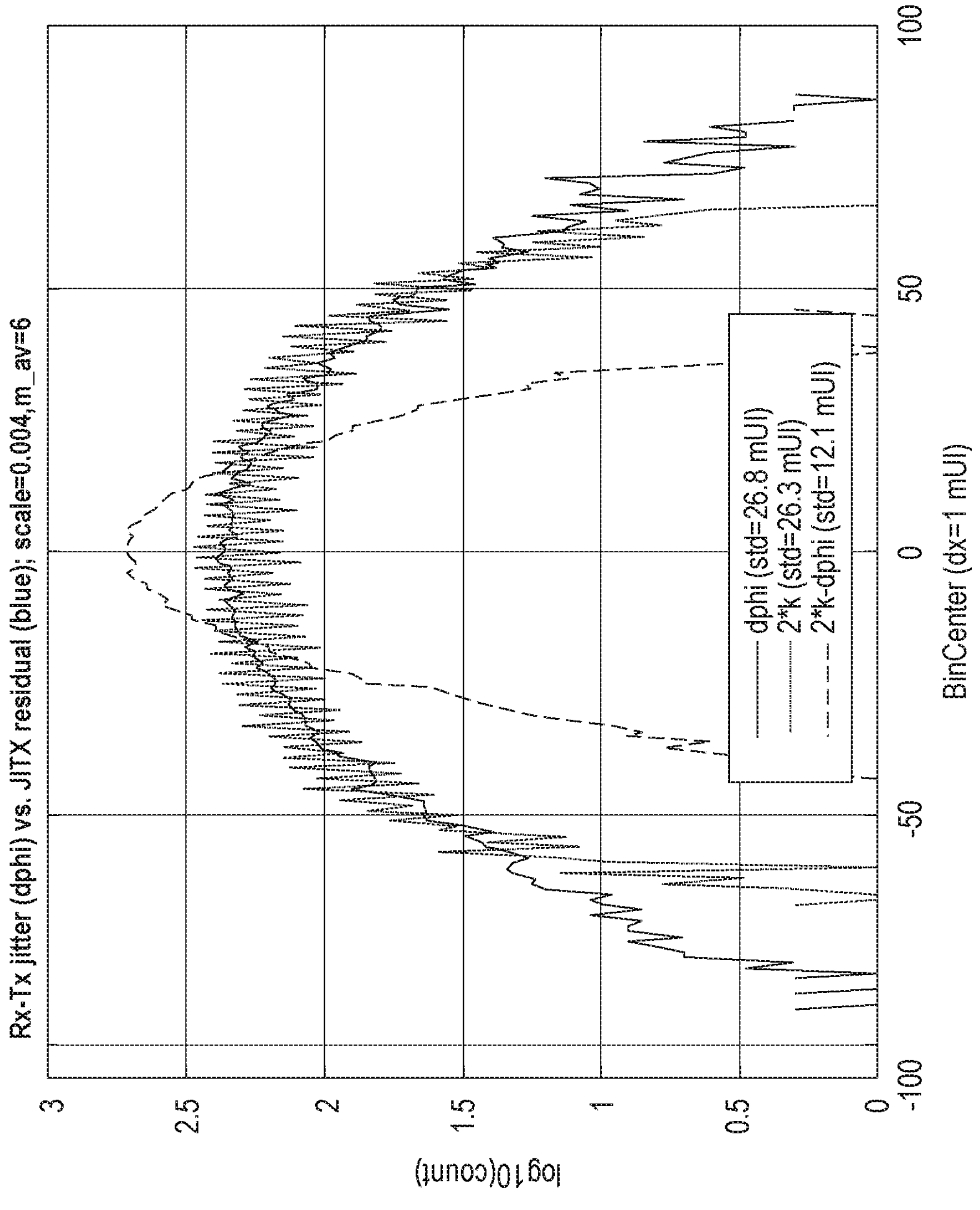
FIG. 5 is a graph of histograms of an actual jitter signal, a jitter correction signal, and a cleaned jitter signal after jitter correction, according to at least one embodiment.

FIG. 5 is a graph 500 of histograms of an actual jitter signal 502, a jitter correction signal 504, and a cleaned jitter signal 506 after jitter correction, according to at least one embodiment. As described above, the jitter correction block can receive the actual jitter signal 502 and estimate the jitter to produce a jitter correction signal 504. By applying the jitter correction signal 504 to the actual jitter signal 502, the jitter correction block produces a cleaned jitter signal 506, effectively removing some or all of the estimated jitter. In at least one embodiment, the jitter correction block can achieve an improvement in jitter from 26.8 mUI to 12.3 mUI, as illustrated in FIG. 5.

Figure 6A:
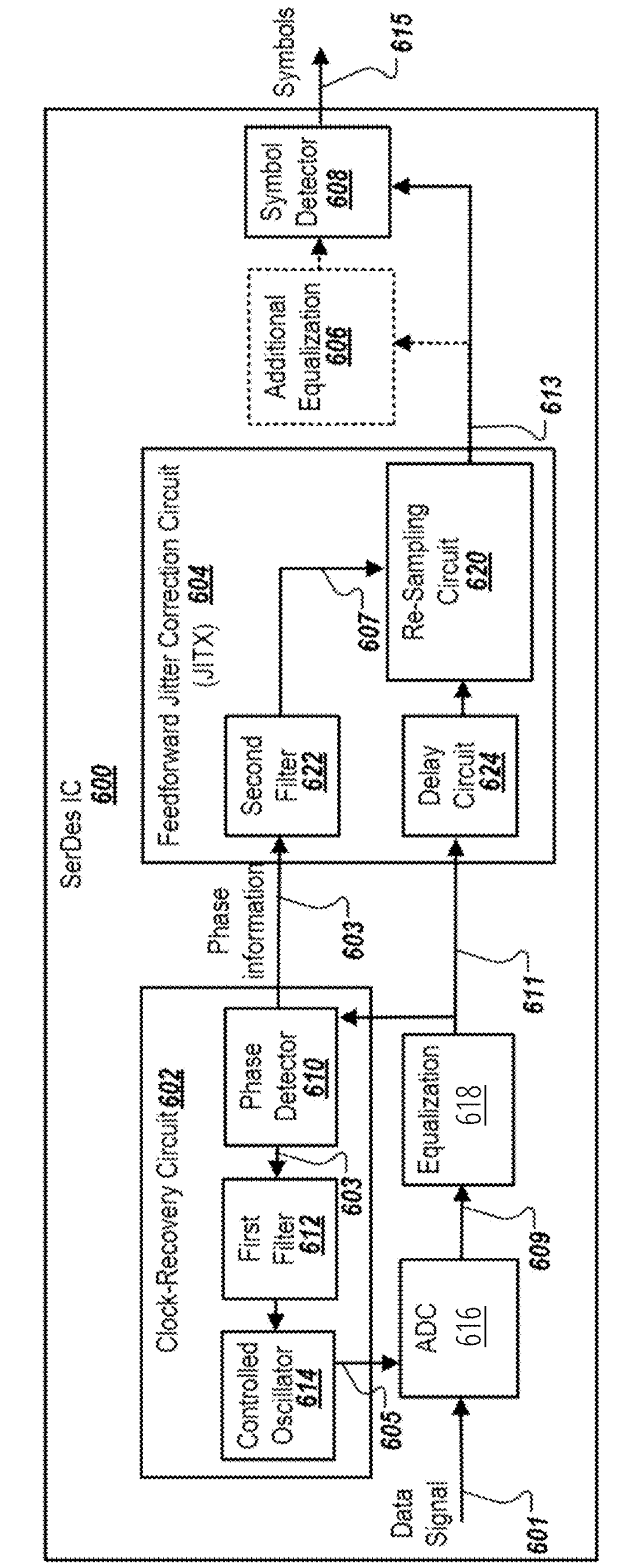
FIG. 6A is a block diagram of a Serializer-Deserializer (SerDes) integrated circuit (IC) with a feedforward jitter correction circuit, according to at least one embodiment.

FIG. 6A is a block diagram of a SerDes IC 600 with a feedforward jitter correction circuit JITX 604, according to at least one embodiment. SerDes IC 600 can be a transceiver that converts parallel data to serial data and vice versa. SerDes IC 600 can facilitate transmission between two devices over serial streams, reducing the number of data paths, wires/traces, terminals, etc. SerDes IC 600 includes a clock-recovery circuit 602 and a JITX 604. The clock-recovery circuit 602 can be coupled to an ADC 616 and an equalization block 618. The JITX 604 can be coupled to an output of the clock-recovery circuit 602. In another embodiment, SerDes IC 600 can include additional equalization block 606 before a symbol detector 608. In at least one embodiment, the additional equalization block 606 is coupled to the output of the JITX 604 before the symbol detector 608. In another embodiment, the feedforward jitter correction circuit 604 is coupled to an output of the additional equalization block 606 before the symbol detector 608. In at least one embodiment, the clock-recovery circuit 602 includes a phase detector 610 to determine phase information 603 about a transmit clock used to transmit a data signal 601 to the SerDes IC 600. The clock-recovery circuit 602 uses the phase information 603 from the phase detector 610 to control a receiver sampling clock 605 in a closed-loop fashion. The clock-recovery circuit 602 receives the data signal 601 and uses the phase information 603 to determine or adjust the receiver sampling clock 605 for subsequent data in the data signal 601. The JITX 604 uses the phase information 603 to control a re-sampling clock 607 in an open-loop fashion to compensate for sampling jitter above a loop bandwidth of the clock-recovery circuit 602.

In at least one embodiment, the clock-recovery circuit 602 includes a feedback loop with the phase detector 610, a first filter 612, and a controlled oscillator (CO) 614 in a closed feedback loop. The CO 614 can be a DCO, a VCO, or the like, as described herein. The ADC 616 generates samples 609 of the data signal 601 using the receiver sampling clock 605. The equalization block 618 determines current data based on the samples 609 and provides an equalization output 611. The equalization output 611 is also used by the phase detector 610 to determine the phase information. The phase detector 610 can measure a phase offset corresponding to the current data. The first filter 612 can filter the phase offset and control the CO 614 based on the filtered phase offset. The clock-recovery circuit 602 can operate with a loop bandwidth at a first frequency (e.g., 4 MHz). The CO 614 can provide the receiver sampling clock 605 based on an output of the first filter 612.

In at least one embodiment, the JITX 604 includes a second filter 622 and a re-sampling circuit 620. The second filter 622 can receive the phase information 603 from the phase detector 610. The second filter 622 can filter the phase offset to reduce the sampling jitter above the first frequency to obtain a filtered phase offset. In at least one embodiment, the second filter 622 can be a running average filter, an FIR filter (e.g., a weighted average), a Kalman filter, or the like. In another embodiment, the second filter 622 is an estimator block that determines an average phase offset over a specified time. The estimator can multiply a measurement of an instantaneous phase offset during a number of clock cycles by a first parameter (e.g., averaging length). The filtered phase offset can be the re-sampling clock 607 or used to generate the re-sampling clock 607 used to re-sample the current data. For example, a phase detector gain block can determine a phase-offset value based on the average phase offset value. The phase detector gain block can convert the average phase offset in terms of a running sum into the phase offset values used by the re-sampling circuit 620. The re-sampling circuit 620 can receive the equalization output 611 and re-samples the equalization output 611 to obtain re-sampled data 613. In another embodiment, the JITX 604 includes a delay circuit 624 that delays the equalization output 611 before the re-sampling circuit 620. This can be done to align the phase information 603 with the current data, given the delay in the clock-recovery circuit 602. The re-sampled data 613 can be input into the symbol detector 608 to generate symbols 615. In another embodiment, the re-sampled data 613 can be input into the additional equalization block 606 before being input into the symbol detector 608.

In at least one embodiment, the second filter 622 determines an average phase offset based on a number of phase offset measurements and multiples the average phase offset by a phase detector gain to obtain the re-sampling clock 607. In at least one embodiment, the re-sampling circuit 620 includes a multi-tap finite impulse response filter (FIR) filter (e.g., 3-tap or 5-tap FIR filter).

Figure 6B:
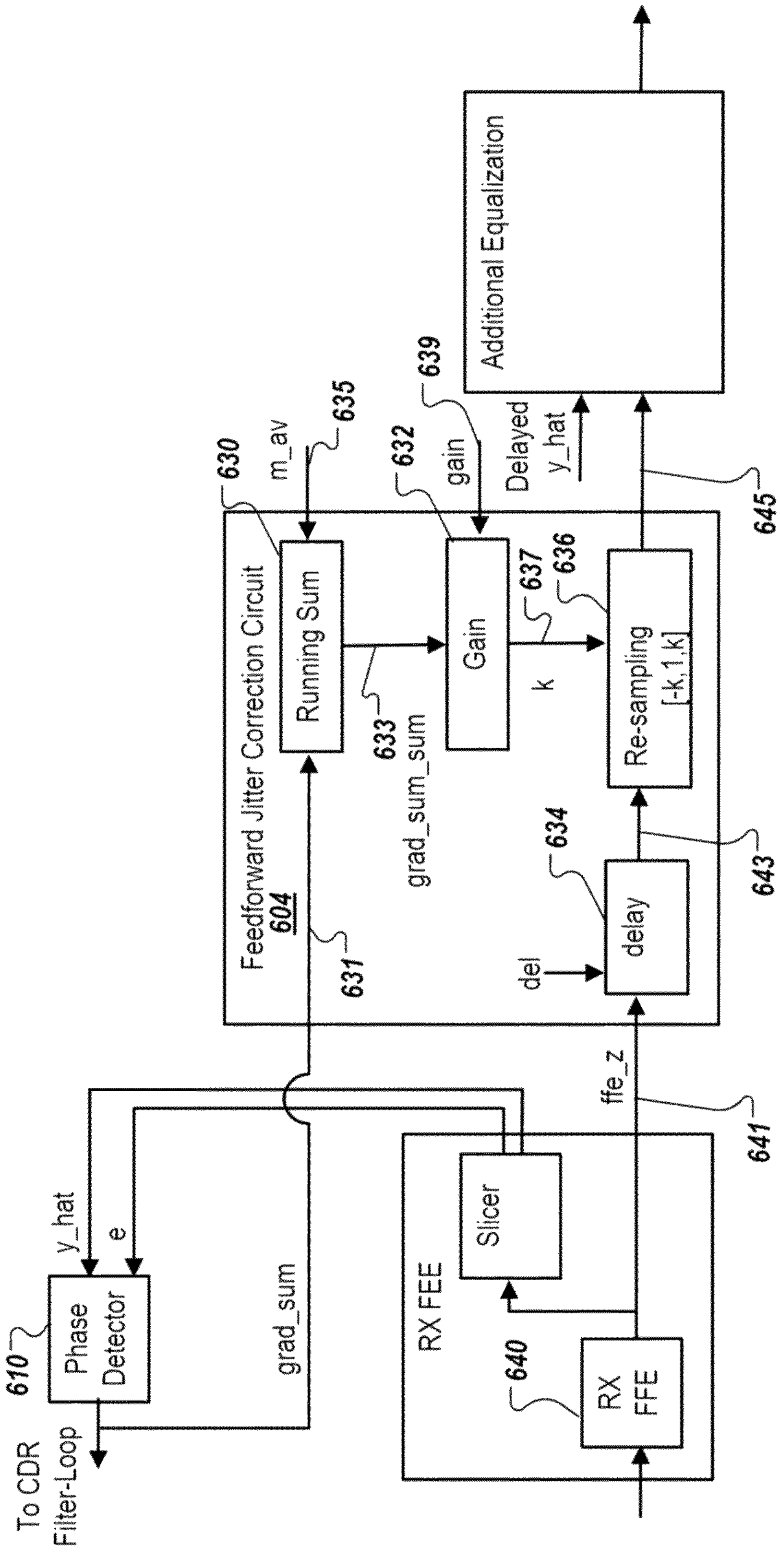
FIG. 6B is a block diagram of a feedforward jitter correction circuit, according to at least one embodiment.

FIG. 6B is a block diagram of a feedforward jitter correction circuit JITX 604, according to at least one embodiment. The JITX 604 of FIG. 6B includes a running sum block 630, a gain block 632, a delay block 634, and a re-sampling block 636. As described above, the phase detector 610 can generate phase information. In this embodiment, the phase detector 610 can output an up-down sum value 631 (updown_sum). The up-down sum value 631 is the sum of all ups less the sum of all downs. For example, the value can range between [−64, +64]. The up-down sum value 631 can be a measurement of the instantaneous phase offset during the last number of clock cycles (e.g., 64T). The running sum block 630 can receive the up-down sum value 631 and determine a running average 633 (updown_sum_sum) of the up-down sum values 631 over time. In at least one embodiment, the running sum block 630 can receive a first parameter 635, averaging length, m_av. In at least one embodiment, the first parameter 635 is 6. Alternatively, other values can be used for the first parameter 635. The first parameter 635 can be multiplied by the number of clock cycles (e.g., 64T) to obtain an amount of time over which the running average 633 is determined (e.g., 6.64T=3.61 ns=(277 MHz)$^{-1}$). The gain block 632 receives the running average 633 and determines a phase correction value 637, k. In at least one embodiment, the gain block 632 can receive a scaling factor 639, referred to as a scaling factor (gain=scale/m_av). The scaling factor is the scale divided by the first parameter 635 (averaging length). The scaling factor can be used to convert from a domain used for the up-down sum values (up-down sum) to phase offsets. In at least one embodiment, the scale is 0.008. Alternatively, other scale values can be used. In at least one embodiment, the scaling factor depends on a pattern selection table, inter-symbol interference (ISI), noise, or the like.

The JITX 604 receives an FFE output 641 from an equalization block (e.g., 618). The FFE output 641 is delayed by the delay block 634 to align with the corresponding phase information measured by the phase detector 610. The delay block 634 outputs a delayed FFE output 643 to the re-sampling block 636. In at least one embodiment, the delay block 634 receives a third parameter (del=3). In at least one embodiment, the third parameter is the delay of the running average 633, which is half of the averaging length (first parameter 635). In at least one embodiment, the third parameter can be used to obtain alignment between FFE output 641 (ffe_out) and phase correction value 637 (k). The delayed FFE output 643 is re-sampled by the re-sampling block 636 to obtain re-sampled data 645. In at least one embodiment, the re-sampling block 636 is a three-tap FIR filter that receives the phase correction value 637, k. The re-sampling block 636 uses the phase correction value 637, k for obtaining three samples (e.g., [−k, 1, k]) of the delayed FFE output 643. The re-sampled data 645 can be further equalized using additional equalization and input into a symbol detector to determine the symbols of the data signal, as described herein.

Figure 6C:
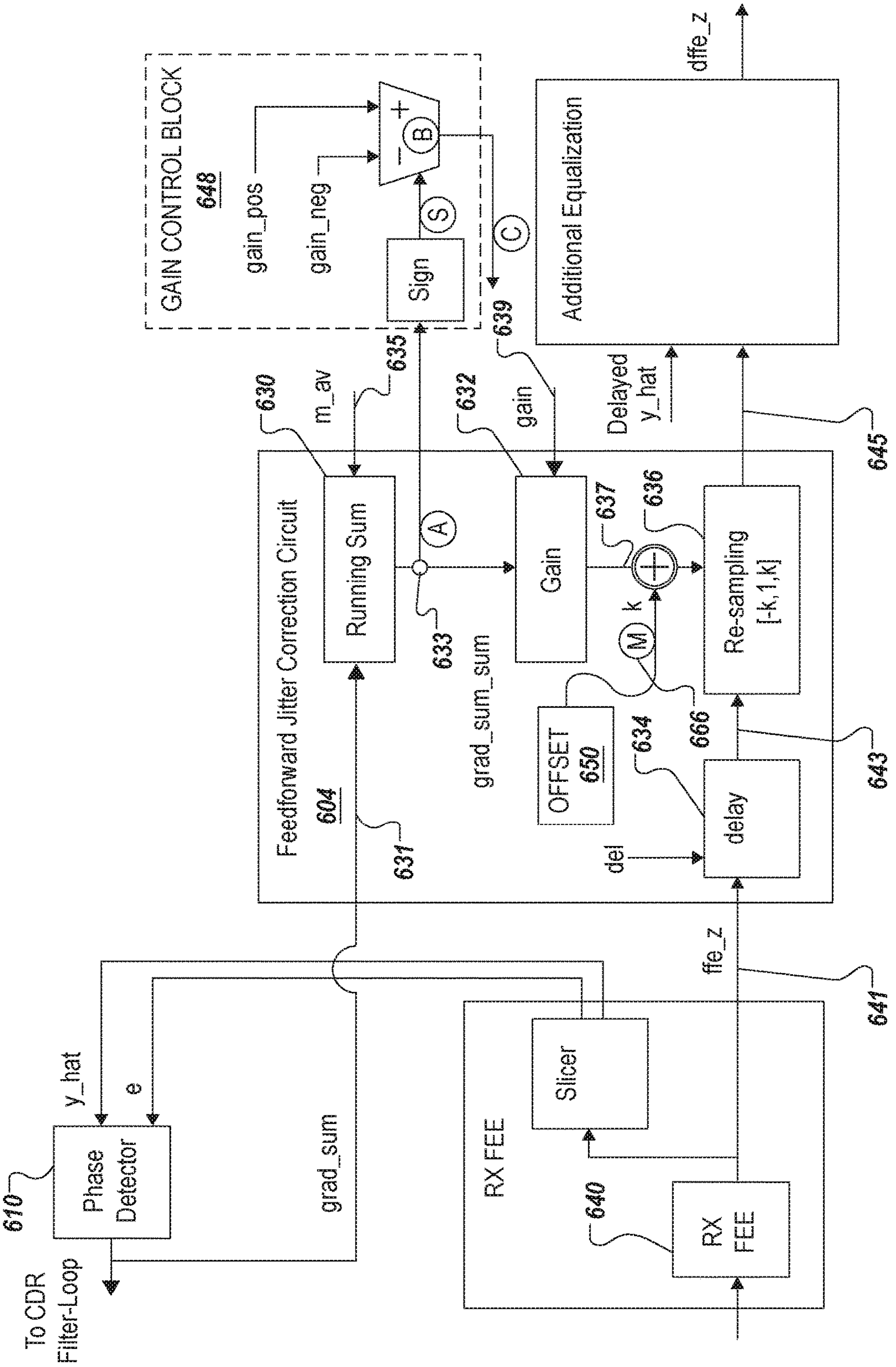
FIG. 6C is a block diagram of a feedforward jitter correction circuit (JITX) with a gain control block and an offset control block, according to at least one embodiment.

FIG. 6C is a block diagram of a feedforward jitter correction circuit JITX 604 with a gain control block 648 and an offset control block 650, according to at least one embodiment. The JITX 604 of FIG. 6C is similar to the JITX 604 of FIG. 6B as noted by similar reference numbers, except that it includes the gain control block 648 and offset control block 650.

As described above, the phase detector 610 can generate phase information. In this embodiment, the phase detector 610 can output an up-down sum value 631 (updown_sum, labeled grad_sum on FIG. 6C for gradient sum). The up-down sum value 631 is the sum of all ups less the sum of all downs. For example, the value can range between [−64, +64]. The up-down sum value 631 can be a measurement of the instantaneous phase offset during the last number of clock cycles (e.g., 64T). The running sum block 630 can receive the up-down sum value 631 and determine a running average 633 (updown_sum_sum, labeled grad_sum_sum on FIG. 6C) of the up-down sum values 631 over time. In at least one embodiment, the running sum block 630 can receive a first parameter 635, averaging length, m_av. In at least one embodiment, the first parameter 635 is 6. Alternatively, other values can be used for the first parameter 635. The first parameter 635 can be multiplied by the number of clock cycles (e.g., 64T) to obtain an amount of time over which the running average 633 is determined (e.g., 6.64T=3.61 ns=(277 MHz)$^{-1}$). The gain block 632 and the gain control block 648 receive the running average 633. The gain control block 648 can determine a sign of the running average 633 and select either a first gain value (e.g., gain pos) or a second gain value (e.g., gain_neg) for the gain block 632 to apply as a scaling factor (also referred to as a second parameter) to the running average 633 to obtain a phase correction value 637 (also referred to as "re-sampling coefficient") based on a sign of the running average 633. It should be noted that the phase correction value 637 is not a direct estimate of the phase. The phase correction value 637 can be a value, the re-sampling coefficient, that is proportional to the phase correction needed if using a 3-tap FIR interpolation, but the interpolator could be different implementations. As such, the phase correction value 637 is a correction value for the re-sampling block 636 (or interpolator). In particular, the phase correction value 637 (signal from the gain block 632) controls the resampling in a general fashion. When the re-sampling block 636 is a 3-tap FFE, the phase correction value 637, k, is directly used as the tap value in [−k, 1, +k]. If the re-sampling block 636 is another implementation, k could be applied differently. The gain control block 648 can determine a sign of the running sum value and select a first gain value or a second gain value based on the sign. The gain control block 648 can apply either the first gain value or the second gain value selected to the running sum value to obtain the phase correction value 637. It should be noted that the gain control block 648 can be like a look-up table (LUT). As illustrated in FIG. 6C, the LUT can be a two-value LUT with just two values to look up, including a first gain value (e.g., gain pos) or a second gain value (e.g., gain_neg). In other embodiments, the LUT could be a full LUT that uses the running average 633 as an index and provides a look-up value based on the index. Thus, it could provide full custom nonlinear scaling between the running average 633 and the scaling factor 639. Saturation of the scaling factor 639 is often desirable, but the simple two-value LUT can be chosen because of the low power of such implementation.

The first gain value and the second gain value are different, allowing the phase compensation to be bigger in one direction of the phase error than the other direction. This can be used for phase adjustments for asymmetric eye shapes.

In at least one embodiment, two additional register can be used to store a first gain value and a second gain value. The added registers can make the gain for the computation of the FFE filter coefficient, k, dependent on the sign of the running average 633 (also referred to as moving sum and labeled grad_sum_sum). This allows the phase compensation to be bigger in one direction of the phase error than the other direction. For example, in one application, signals received from optical direct modulation transmitters typically exhibiting a fish-eyed shape with maximum vertical eye opening towards earlier time. The gain control block 648 provides a first control mechanism that uses the sign (S) of the moving sum (A) to control a multiplexer (B) with inputs from the added registers (gain pos and gain_neg). The multiplexer (B) output the gain signal (C) to the gain block 632 as a scaling factor 639 (also referred to as second parameter).

The gain block 632 receives the running average 633, and the selected scaling factor 639 (gain signal (C)) from the gain control block 648, and determines a phase correction value 637, k, using the selected scaling factor 639. The scaling factor 639 can be two different scale values. The phase correction value 637 can be used to convert from a domain used for the up-down sum values (up-down sum) to phase offsets on the signal 643 effectuated by the resampling filter to provide the resampled output signal 645. In at least one embodiment, the scaling factor 639 can be 0.008 and Y. Alternatively, other values can be used for the scaling factor 639. In at least one embodiment, the scaling factor depends on a pattern selection table, inter-symbol interference (ISI), noise, or the like.

In at least one embodiment, the offset control block 650 can provide a second control mechanism that uses an offset signal (M), semi-static offset value 666 (or static offset value), that is added to the phase correction value 637 (k-value) before the interpolation by the re-sampling block 636 to optimize the sampling point in time. The semi-static offset value 666 allows for a static resampling phase offset, which can be valuable.

As described above, during operation, the JITX 604 receives an FFE output 641 from an equalization block (e.g., 618). The FFE output 641 is delayed by the delay block 634 to align with the corresponding phase information measured by the phase detector 610. The delay block 634 outputs a delayed FFE output 643 to the re-sampling block 636. In at least one embodiment, the delay block 634 receives a third parameter (del=3). In at least one embodiment, the third parameter is the delay of the running average 633, which is half of the averaging length (first parameter 635). In at least one embodiment, the third parameter can be used to obtain alignment between FFE output 641 (ffe_out) and phase correction value 637 (*k*). The delayed FFE output 643 is re-sampled by the re-sampling block 636 to obtain re-sampled data 645. In at least one embodiment, the re-sampling block 636 is a three-tap FIR filter that receives the phase correction value 637, k. The re-sampling block 636 uses the phase correction value 637, k for obtaining three samples (e.g., multiplied by [-k, 1, k]) of the delayed FFE output 643. In some cases, the semi-static offset value 666 is added to the phase correction value 637. The re-sampled data 645 can be further equalized using additional equalization and input into a symbol detector to determine the symbols of the data signal, as described herein.

Figure 6D:
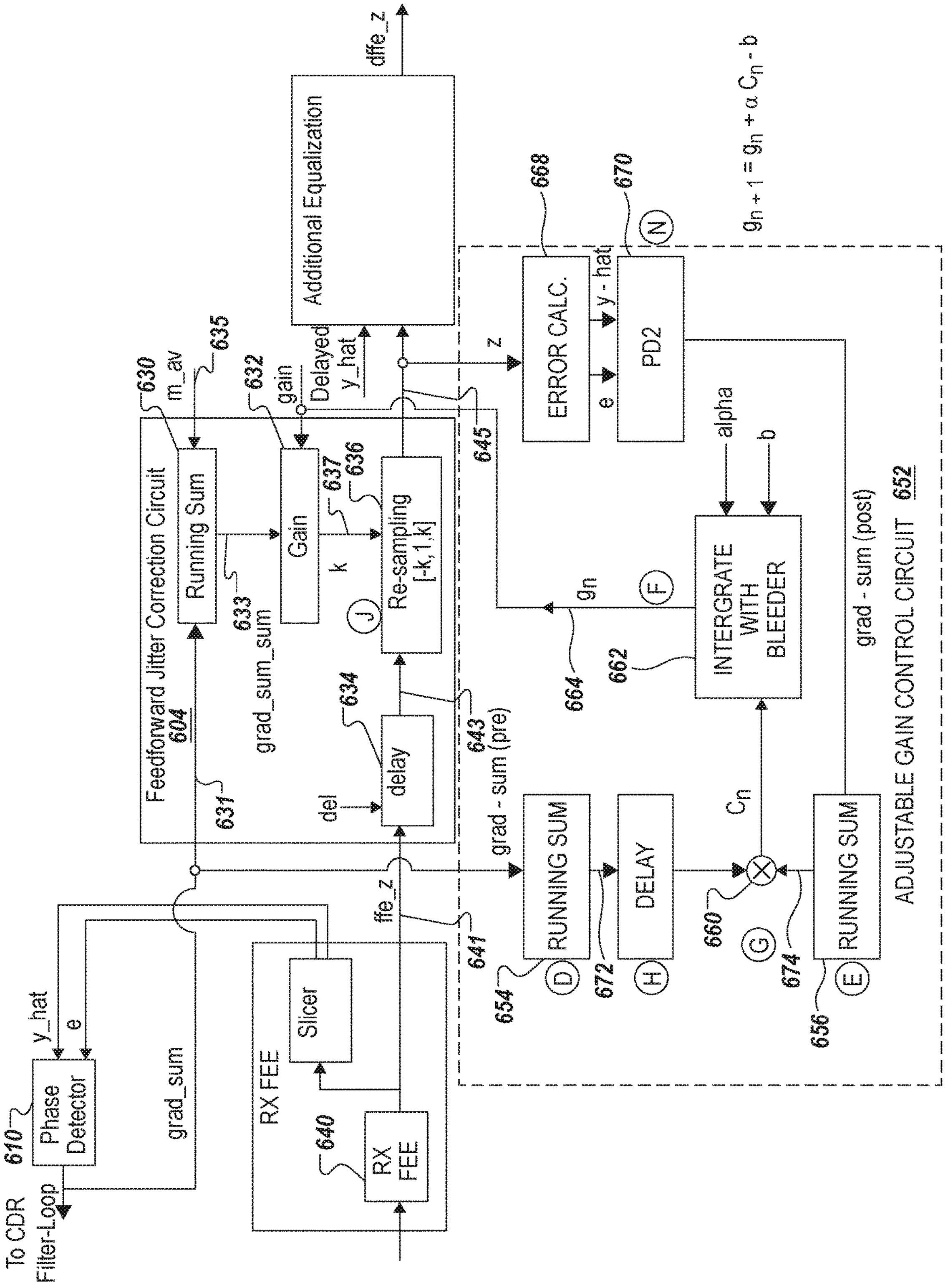
FIG. 6D is a block diagram of a feedforward jitter correction circuit (JITX) with an adjustable gain control circuit, according to at least one embodiment.

FIG. 6D is a block diagram of a feedforward jitter correction circuit JITX 604 with an adjustable gain control circuit 652, according to at least one embodiment. The JITX 604 of FIG. 6D is similar to the JITX 604 of FIG. 6B as noted by similar reference numbers, except it includes the adjustable gain control circuit 652. The adjustable gain control circuit 652 includes a first estimator block 654, a second estimator block 656, a delay block 658, a multiplication block 660, a gain calculator block 662, a variable gain 664, an error calculator block 668, and a phase detector block 670.

In at least one embodiment, the first estimator block 654 is similar to the running sum block 630 of the JITX 604. That is, the phase detector 610 can output an up-down sum value 631 (updown_sum) (also referred to as a grad_sum value). The up-down sum value 631 is the sum of all ups less the sum of all downs. For example, the value can range between [−64, +64]. The up-down sum value 631 can be a measurement of the instantaneous phase offset during the last number of clock cycles (e.g., 64T). Since this up-down sum value 631 is before the feedforward jitter correction circuit 604, it is referred to as grad_sum_pre for the adjustable gain control circuit 652. Like the running sum block 630, the first estimator block 654 can receive the up-down sum value 631 and determine a first running average 672 (grad_sum_sum_pre) of the up-down sum values 631 over time. The first running average 672 is also referred to as a first running sum value based on the first phase information (pre-JITX). In another embodiment, the running sum block 630 can be used to provide the first running average 672 to the adjustable gain control circuit 652, since the first running average 672 and the running average 633 can be the same.

The error calculator block 668, phase detector block 670, and second estimator block 656 can be used to generate a second running average 674 (grad_sum_sum_post). The second running average 674 is also referred to as a second running sum value based on the second phase information (post-JITX). In particular, the error calculator block 668 can receive the re-sampled data 645 and generate error information (error (e) and y(hat)). The error calculator block 668 can operate in a similar manner to the slicer of the RX FFE that outputs error information to the phase detector 610. Like the phase detector 610, the second phase detector block 670 can determine second phase information about the re-sampled data 645 using the error information from the error calculator block 668. The second phase information can be similar to the up-down sum value 631 that is provided to the running sum block 630, except the up-down sum value from the error calculator block 668 is after the feedforward jitter correction circuit 604, so it is referred to as grad_sum_post for the adjustable gain control circuit 652. The delay block 658 can receive the first running average 672 from the first estimator block 654 to align the first running average 672 with the second running average 674 before a multiplication block 660 multiplies them to obtain a product, referred to as a correlation metric between the first running average 672 and the second running average 674. Once the adjustable gain control circuit 652 determines the correlation metric between the first running average 672 and second running average 674, it can adjust a variable gain setting of the jitter correction block 604 from a first gain value to a second gain value based on the correlation metric. The second gain value can be higher than the first gain value responsive to the correlation metric being a positive number indicating a correlation between the first running average 672 and the second running average 674. The second gain value can be lower than the first gain value responsive to the correlation metric being a negative number indicating a de-correlation between the first running average 672 and the second running average 674. The second gain value can be equal to the first gain value responsive to the correlation metric being zero, indicating an optimum gain setting.

In at least one embodiment, the adjustable gain control circuit 652 includes a gain calculator block 662, which can be an integrator with a slope parameter (alpha) and a bleeder parameter (β), to determine an accumulated product (F) of moving sums from the two detectors (D and E). The integrator can determine the second gain value for the variable gain 664 using the following Equation 2:

$$g_{n+1} = g_n + \alpha * C_n - \beta,$$

where $g_{n+1}$ represents the second gain value, $g_n$, represents the first gain value, α represents the slope parameter, β represents the bleeder parameter, and $C_n$ represents a product of the first running sum value and the second running sum value.

As described above, the adjustable gain control circuit 652 can determine the correlation metric as an accumulated product (F) of the first running sum value and the second running sum value. The adjustable gain control circuit 652 can include the delay block 658 (i.e., a delay element) to align the first running sum value and the second running sum value before determining the product or the accumulated product.

During operation, the feedforward jitter correction circuit 604 can receive the current data from the equalizer block. The feedforward jitter correction circuit 604 can determine a third running sum value based on the first phase information received from the first phase detector block. The feedforward jitter correction circuit 604 can apply the first gain value to the third running sum value to obtain a phase correction value. The feedforward jitter correction circuit 604 can re-sample, using the phase correction value, the current data to obtain the re-sampled data to reduce jitter in the current data. After adjusting the variable gain setting from the first gain value to the second gain value, the feedforward jitter correction circuit 604 can receive subsequent data from the equalizer block. The feedforward jitter correction circuit 604 can determine a fourth running sum value based on third phase information received from the first phase detector block. The feedforward jitter correction circuit 604 can apply the second gain value to the fourth running sum value to obtain a second phase correction value. The feedforward jitter correction circuit 604 can re-sample, using the second phase correction value, the subsequent data to obtain the re-sampled subsequent data.

The adjustable gain control circuit 652 can be used to implement the third enhancement 3), including gain adaptation. The third enhancement is achieved by adding a second phase detector (N) after the re-sampling block 636 (J). Correlation between the first and second detectors determines that the gain can be turned up. De-correlation between the first and second detectors determines that the gain should be turned down. For the optimum gain setting, there is no correlation between the two phase detectors. As described above, correlation can be computed as the accumulated product (F) of moving sums from the two detectors (D and E). A delay (H) is needed to align the signals before correlation. The sum (F) is based on an integrator with a slope (alpha or a) and a bleeder (p), as expressed in Equation 2 above. With a positive sign of the bleeder, the settling value for gain can be reduced. In some embodiments in systems with low signal-to-noise ratio (SNR) a slightly reduced gain value gives optimum system performance. There are other ways to equalize the receiver so that the bleeder (p) value is not needed or not increased in other scenarios.

Figure 7A:
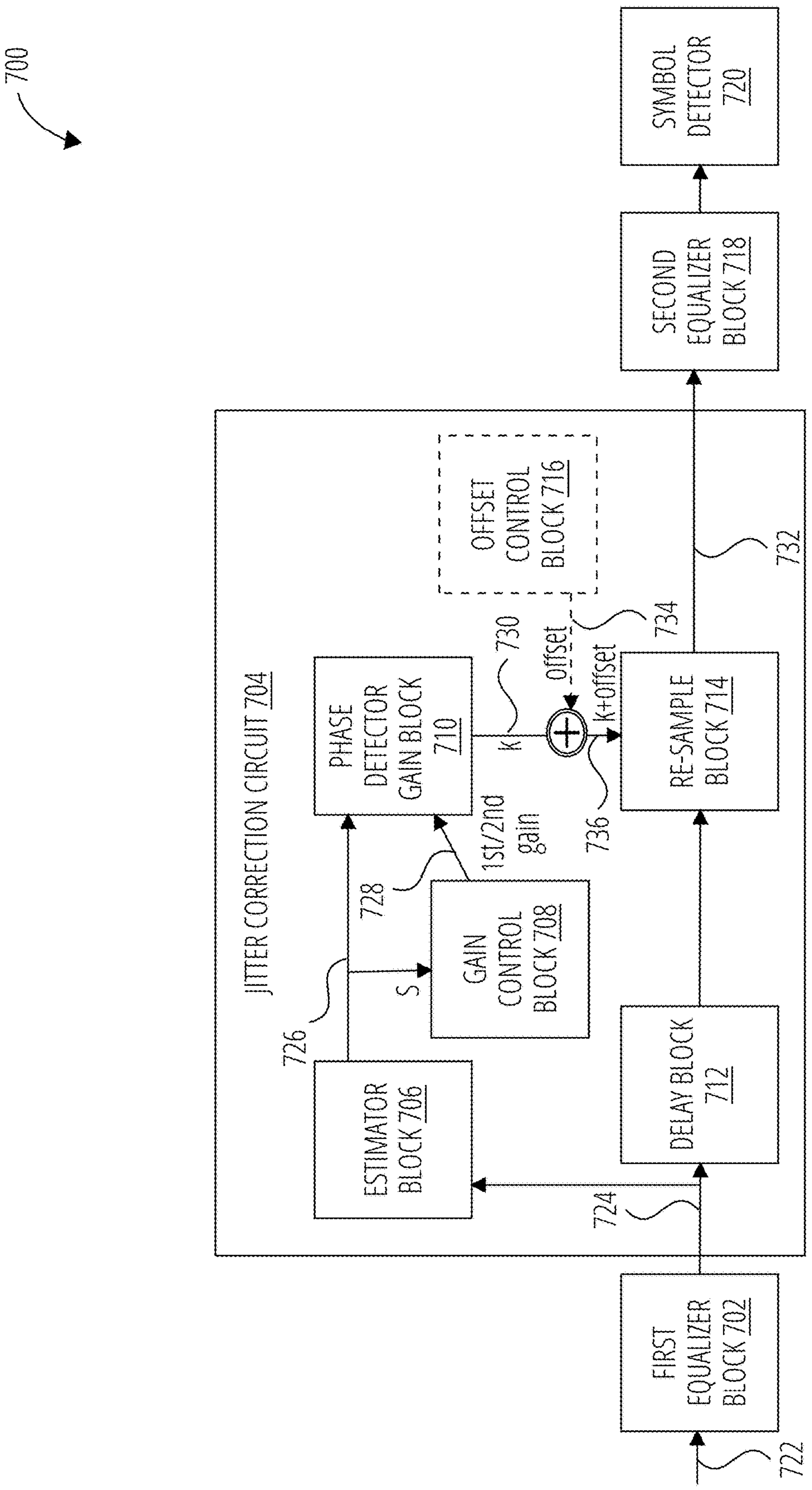
FIG. 7A is a block diagram of a receiver device with a jitter correction circuit having a gain control block and offset control block, according to at least one embodiment.

FIG. 7A is a block diagram of a receiver device 700 with a jitter correction circuit 704 having a gain control block 708 and offset control block 716 according to at least one embodiment. In this embodiment, the receiver device 700 includes a first equalizer block 702 that obtains current data 724 based on an incoming signal 722 sampled by an ADC of the receiver device 700. The jitter correction circuit 704 is coupled to the first equalizer block 702. The jitter correction circuit 704 includes an estimator block 706 to determine an average phase-offset value over a specified time by multiplying a measurement of an instantaneous phase offset during a number of clock cycles by a first parameter value (e.g., averaging length or m_av). The jitter correction circuit 704 includes a gain control block 708 to determine a sign (S) of the average phase-offset value 726 and select either a first gain value or a second gain value for a gain parameter 728 based on the sign, the first gain value and the second gain value being different. The jitter correction circuit 704 includes a phase detector gain block 710 to determine a phase-offset value 730, k, based on the average phase-offset value 726 and the gain parameter 728, which is either the first gain value or the second gain value selected by the gain control block 708. The jitter correction circuit 704 can include a delay block 712 to delay the current data 724 to align the current data 724 with the phase-offset value 730 corresponding to the current data 724. The jitter correction circuit 704 can include a re-sample block 714 to re-sample the current data 724 (delayed by the delay block 712) using the phase-offset value 730 to obtain re-sampled data 732 to reduce jitter in the current data 724.

In at least one embodiment, the jitter correction circuit 704 includes an offset control block 716 to add a semi-static offset value 734 (o) (or static offset value) to the phase-offset value 730 (k) to obtain a modified phase-offset value 736 (k+offset), wherein the re-sample block 714 uses the modified phase-offset value 736 to re-sample the current data 724 to obtain the re-sampled data 732.

In a further embodiment, the receiver device 700 further includes a second equalizer block 718 to receive the re-sampled data 732 for further equalization, and a symbol detector 720 coupled to the second equalizer block 718. In at least one embodiment, the second equalizer block 718 is a DFE, and the first equalizer block 702 is an FFE.

Figure 7B:
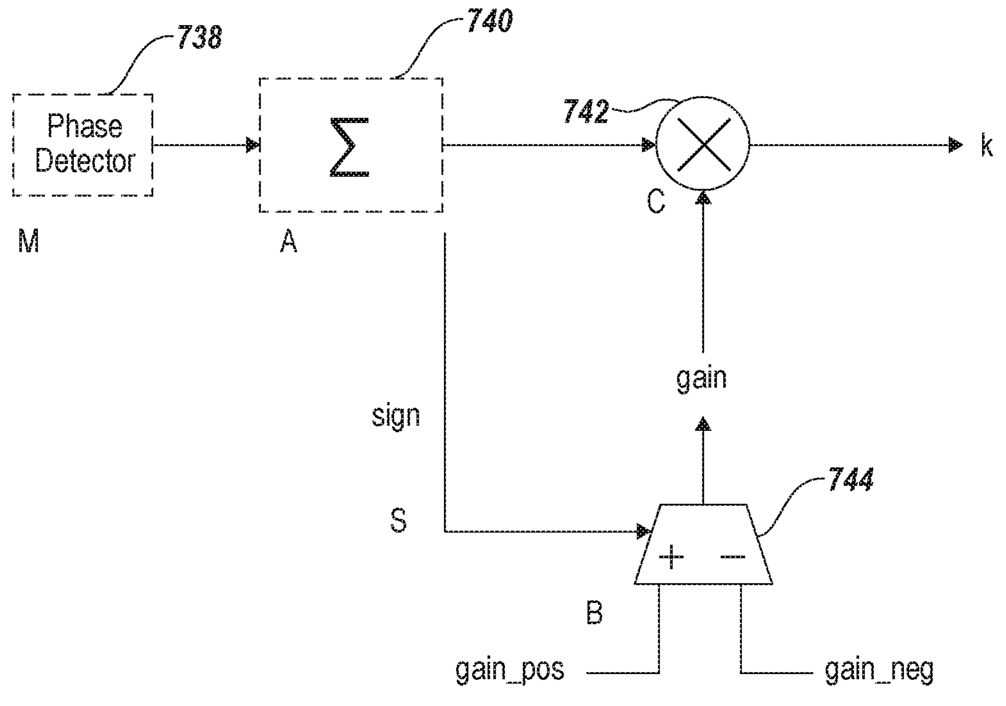
FIG. 7B is a functional diagram illustrating a function of the gain control block of FIG. 7A, according to at least one embodiment.

FIG. 7B is a functional diagram illustrating a function of the gain control block 708 of FIG. 7A according to at least one embodiment. In this example, a filter (e.g., second filter 622 of FIG. 6A) of the jitter correction circuit can use a phase detector 738 to determine phase-offset values and an accumulator 740 to accumulate the phase-offset value to obtain an accumulated phase-offset value (i.e., moving sum, grad_sum_sum). A multiplier 742 multiplies the accumulated phase-offset value by a gain to obtain a phase correction value, k (also referred to as FFE filter coefficient, k). The gain control block 708 can determine a sign of the accumulated phase-offset value output from the accumulator 740 and select a gain for the computation of the FFE filter coefficient, k, dependent on the sign of the accumulated phase-offset value (i.e., moving sum, grad_sum_sum). In particular, the gain control block 708 includes a multiplexer 744 that is controlled by the sign of the accumulated phase-offset value (i.e., moving sum, grad_sum_sum). The multiplexer 744 can select one of two different gain values (e.g., gain pos and gain_neg) based on the sign of the accumulated phase-offset value (i.e., moving sum, grad_sum_sum). The gain control block 708 allows phase compensation to be bigger in one direction of the phase error than the other direction.

Figure 7C:
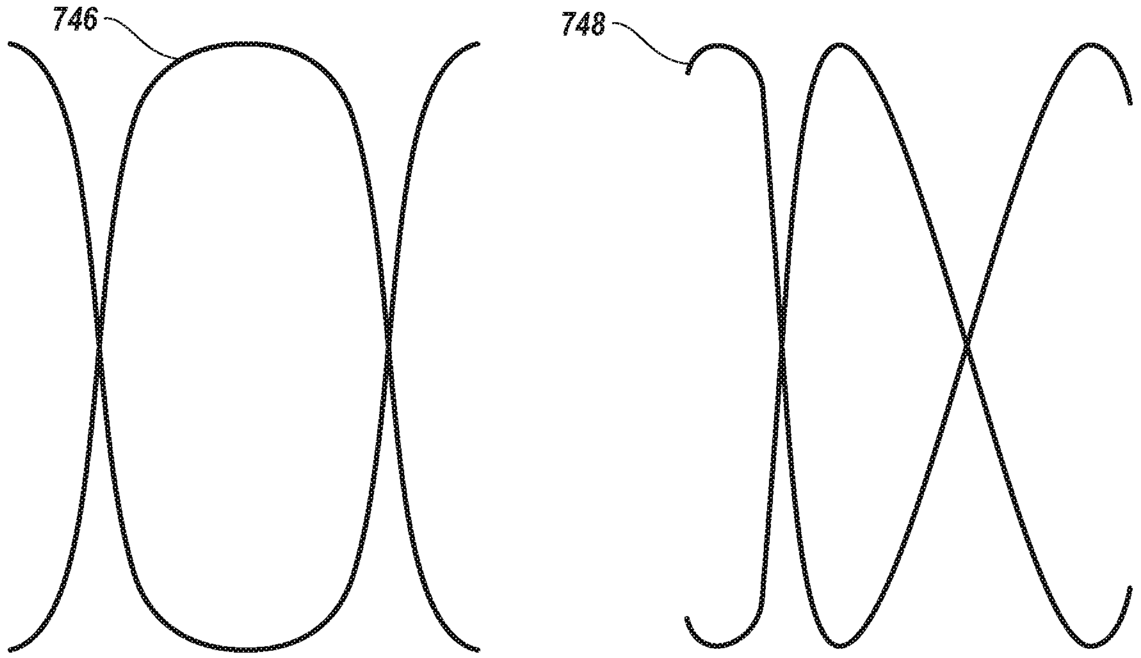
FIG. 7C illustrates a regular signal and a signal received from an optical transmitter, according to at least one embodiment.

FIG. 7C illustrates a regular signal 746 and a signal 748 received from an optical transmitter according to at least one embodiment. In the signal 748 received from optical transmitters, a fish-eyed shape is often seen with a maximum vertical eye opening that is earlier in time, as opposed to the regular signal 746 that is later in time. Resampling towards the earlier time should therefore be reduced. This can be achieved with the two enhancements 1) and 2). The moving sum (A) sign (S) controls a mux (B) with the inputs from registers gain pos and gain_neg. The mux output replaces the previous gain knob and controls the magnifier (C). The second new enhancement is to add an offset to the k-value before the interpolation. This allows for static offset of the resampled phase, valuable in some cases.

Figure 8A:
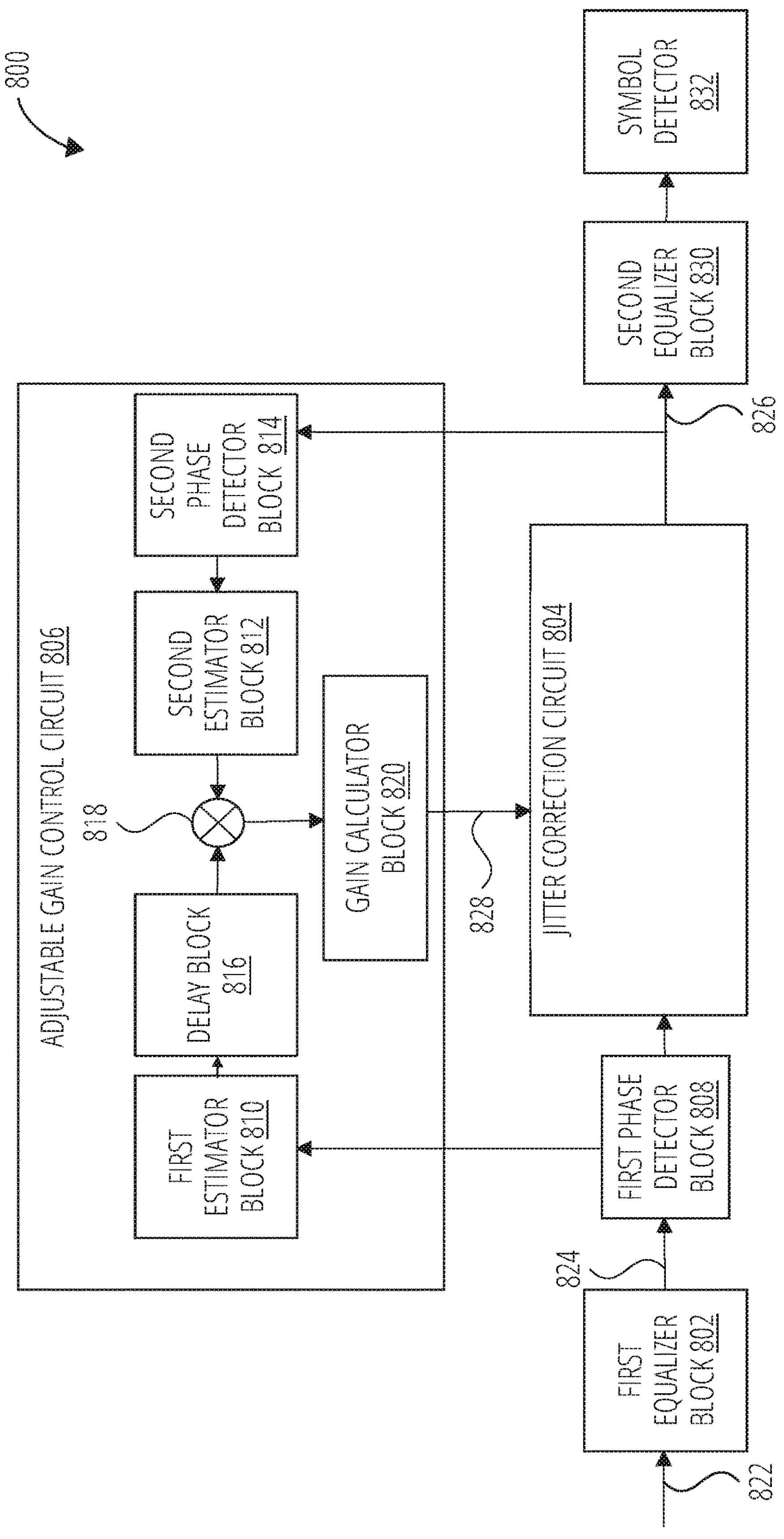
FIG. 8A is a block diagram of a receiver device with a jitter correction circuit and an adjustable gain control circuit, according to at least one embodiment.

FIG. 8A is a block diagram of a receiver device 800 with a jitter correction circuit 804 and an adjustable gain control circuit 806, according to at least one embodiment. In this embodiment, the receiver device 800 includes the jitter correction circuit 804, a first equalizer block 802 to generate current data 824 based on an incoming signal 822 sampled by an ADC of the receiver device 800, a first phase detector block 808 to determine first phase information based on the current data 824, and the adjustable gain control circuit 806. The adjustable gain control circuit 806 includes a second phase detector block 814 to determine second phase information based on re-sampled data 826 from an output of the jitter correction circuit 804. The adjustable gain control circuit 806 can determine a first running sum value based on the first phase information, determine a second running sum value based on the second phase information, determine a correlation metric between the first running sum value and the second running sum value, and adjust a variable gain setting of the jitter correction circuit 804 from a first gain value to a second gain value based on the correlation metric.

In at least one embodiment, the jitter correction circuit 804 can determine a phase-offset value using a first phase-offset value from the first phase detector block 808 and a variable gain 828 from the adjustable gain control circuit 806, and re-sample the data using the phase-offset value to obtain re-sampled data 826. The adjustable gain control circuit 806 can include a first estimator block 810 to determine a first average phase-offset value over a specified time by multiplying a measurement of an instantaneous phase offset of the data, received from the first phase detector block 808 during a number of clock cycles, by a first parameter value. The adjustable gain control circuit 806 can include a second estimator block 812 to determine a second average phase-offset value over the specified time by multiplying a measurement of an instantaneous phase offset of the re-sampled data 826, received from the second phase detector block 814, during the number of clock cycles by the first parameter value. The adjustable gain control circuit 806 can include a delay block 816 to delay the first average phase-offset value to align with the second average phase-offset value, and a multiplication block 818 to determine a product of the first average offset value and the second average phase-offset value. The adjustable gain control circuit 806 can include a gain calculator block 820 to adjust the variable gain 828 using the product.

In at least one embodiment, the jitter correction circuit 804 includes a third estimator block to determine the first average phase-offset value over the specified time by multiplying the measurement of the instantaneous phase offset of the data during a number of clock cycles by the first parameter value and a phase detector gain block to determine the phase-offset value based on the first average phase-offset value and the variable gain 828 from the gain calculator block 820. The jitter correction circuit 804 can include a delay block to delay the data to align the data with the phase-offset value corresponding to the data, and a re-sample block to re-sample the data using the phase-offset value to obtain the re-sampled data 826 to reduce jitter in the data.

In at least one embodiment, the gain calculator block 820 can determine a correlation metric as an accumulated product (F) of the first average phase-offset value and the second average phase-offset value. In at least one embodiment, the gain calculator block 820 can increase the variable gain 828 responsive to the correlation metric being a positive number indicating a correlation between the first average phase-offset value and the second average phase-offset value. The gain calculator block 820 can decrease the variable gain 828 responsive to the correlation metric being a negative number indicating a de-correlation between the first average phase-offset value and the second average phase-offset value. The gain calculator block 820 can maintain the variable gain 828 responsive to the correlation metric being zero.

In at least one embodiment, the gain calculator block 820 includes an integrator with a slope parameter and a bleeder parameter. The integrator can determine the variable gain 828 using Equation 2, where $g_{n+1}$ represents an adjusted gain value, $g_n$ represents a current gain value, $\alpha$ represents the slope parameter, $\beta$ represents the bleeder parameter, and $C_n$ represents a product of the first phase-offset value and the second phase-offset value. In at least one embodiment, the adjustable gain control circuit 806 includes an error calculator block that receives the re-sampled data 826 and generates error information for the second phase detector block 814.

In a further embodiment, the receiver device 800 further includes a second equalizer block 830 to receive the re-sampled data 826 for further equalization, and a symbol detector 832 coupled to the second equalizer block 830. In at least one embodiment, the second equalizer block 830 is a DFE, and the first equalizer block 802 is an FFE.

Figure 8B:
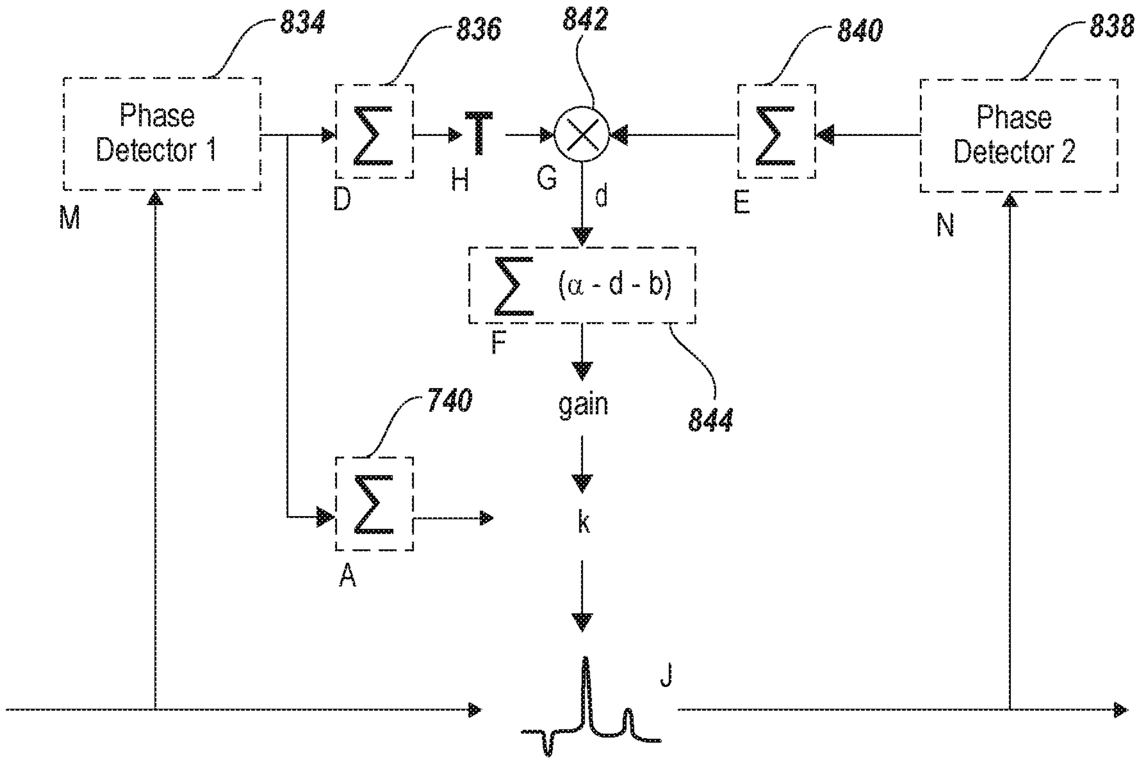
FIG. 8B is a functional diagram illustrating a function of the adjustable gain control circuit of FIG. 8A, according to at least one embodiment.

FIG. 8B is a functional diagram illustrating a function of the adjustable gain control circuit 806 of FIG. 8A according to at least one embodiment. In this example, a filter (e.g., second filter 622 of FIG. 6A) of the jitter correction circuit can use a first phase detector 834 to determine first phase-offset values and a first accumulator 836 to accumulate the first phase-offset value to obtain a first accumulated phase-offset value (i.e., moving sum, grad_sum_sum_pre). The jitter correction circuit also includes a second phase detector 838 to determine second phase-offset values for the re-sampled data and a second accumulator 840 to accumulate the second phase-offset values to obtain a second accumulated phase-offset value (i.e., moving sum, grad_sum_sum_post). A multiplier 842 multiplies the first accumulated phase-offset value and the second accumulated phase-offset value to obtain a product. An integrator 844 can integrate the product using the Equation 2 to obtain a variable gain value. A gain control block is to use the phase correction value, k, and the variable gain value to interpolate the data to obtain the re-sampled data.

As illustrated here, a second phase detector 838 (N) is added after the re-sampling (J). Correlation between the first and second detectors determines that the gain can be turned up. De-correlation between the first and second detectors determines that the gain should be turned down. For the optimum gain setting, there is no correlation between the two phase detectors. Correlation is computed as the accumulated product of signs (F) of moving sums from the two detectors (D and E). The delays have to be matched before correlation, so a delay element (H) can be added. The sum (F) is based on a multiply and accumulate function with a slope (α) and a bleeder (β). With positive sign of the bleeder, the settling value for gain will be reduced. For example, in systems with low SNR a slightly reduced gain value gives optimum system performance.

It should be noted that the adjustable gain control circuit 806 can be run once, periodically, or continuously.

Figure 9:
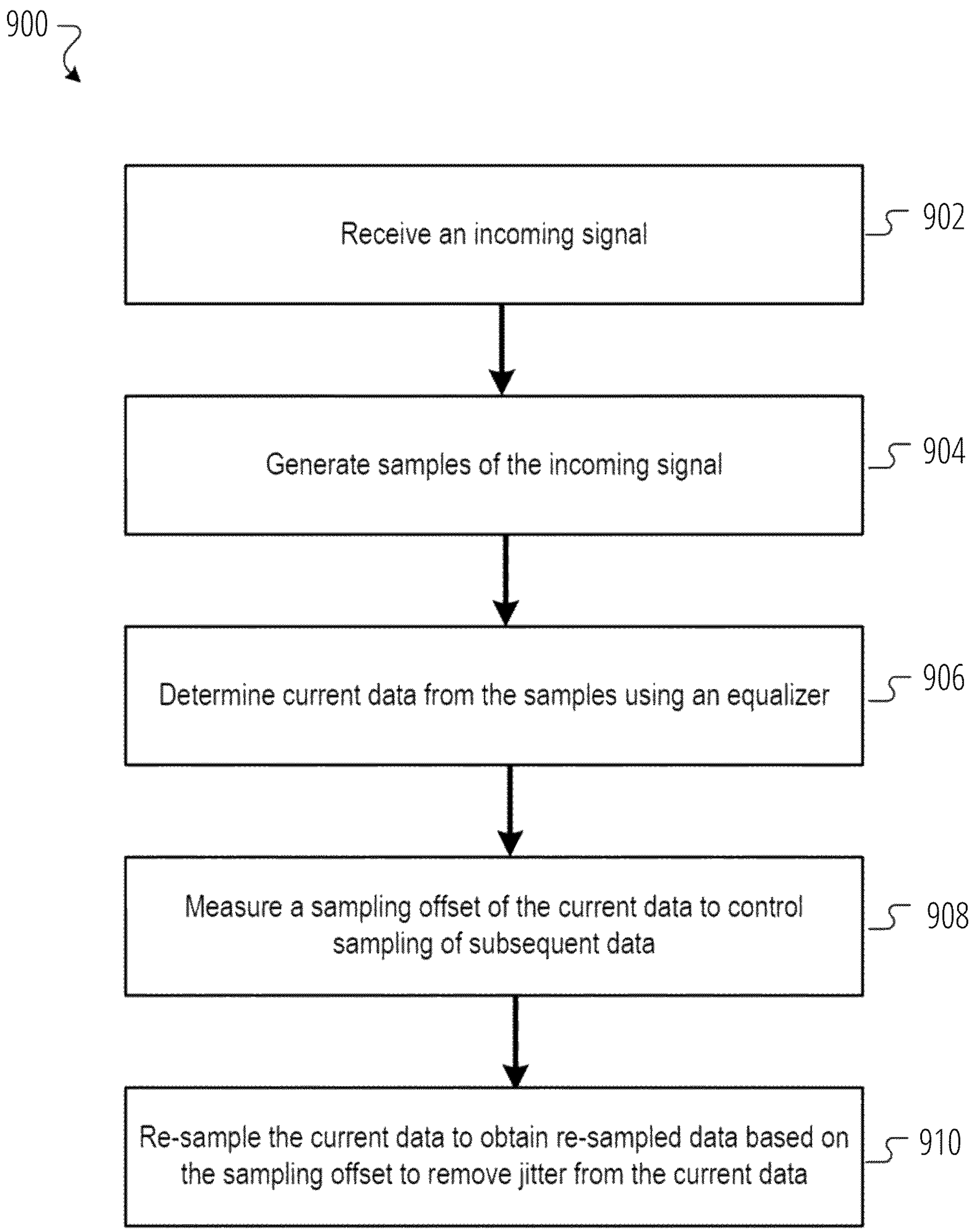
FIG. 9 is a flow diagram of a method for reducing jitter in an incoming signal, in accordance with at least some embodiments.

FIG. 9 is a flow diagram of a method 900 for reducing jitter in an incoming signal, in accordance with at least some embodiments. The method 900 can be performed by processing logic comprising hardware, software, firmware, or any combination thereof. In at least one embodiment, the method 900 is performed by any one of device 110 or device 112 of FIG. 1A to FIG. 1B or the receiver 104 of FIG. 1A to FIG. 1B. In at least one embodiment, the method 900 is performed by the receiver 200 of FIG. 2. In another embodiment, the method 900 is performed by SerDes IC 600 of FIG. 6A. In yet another embodiment, the method 900 is performed by feedforward jitter correction circuit 604 of FIG. 6B.

Referring to FIG. 9, the method 900 begins with the processing logic receiving an incoming signal (block 902). The processing logic generates samples of the incoming signal using an ADC (block 904). The processing logic determines current data from the samples using an equalizer block (block 906). The processing logic measures, using a TED or a phase detector of a clock recovery (CR) block, a sampling offset of the current data to control sampling of subsequent data by the ADC (block 908). The processing logic re-samples the current data to obtain re-sampled data based on the sampling offset to reduce jitter in the current data (block 910), and the method 900 ends.

In a further embodiment, the processing logic filters the sampling offset of the current data using a low-pass filter at a first frequency to obtain a first filtered sampling offset. The processing logic determines a phase-offset value based on the first filtered sampling offset. The processing logic re-samples the current data by re-sampling the current data using the phase-offset value. In at least one embodiment, the processing logic uses a multi-tap FIR filter to re-sample the current data. In another embodiment, the processing logic uses a multi-tap FFE to re-sample the current data.

In a further embodiment, the processing logic filters the sampling offset to obtain a second filtered sampling offset using a loop filter of the CR block at a loop bandwidth at a second frequency higher than the first frequency. The processing logic controls the sampling of the subsequent data by the ADC based on the second filtered sampling offset.

Figure 10:
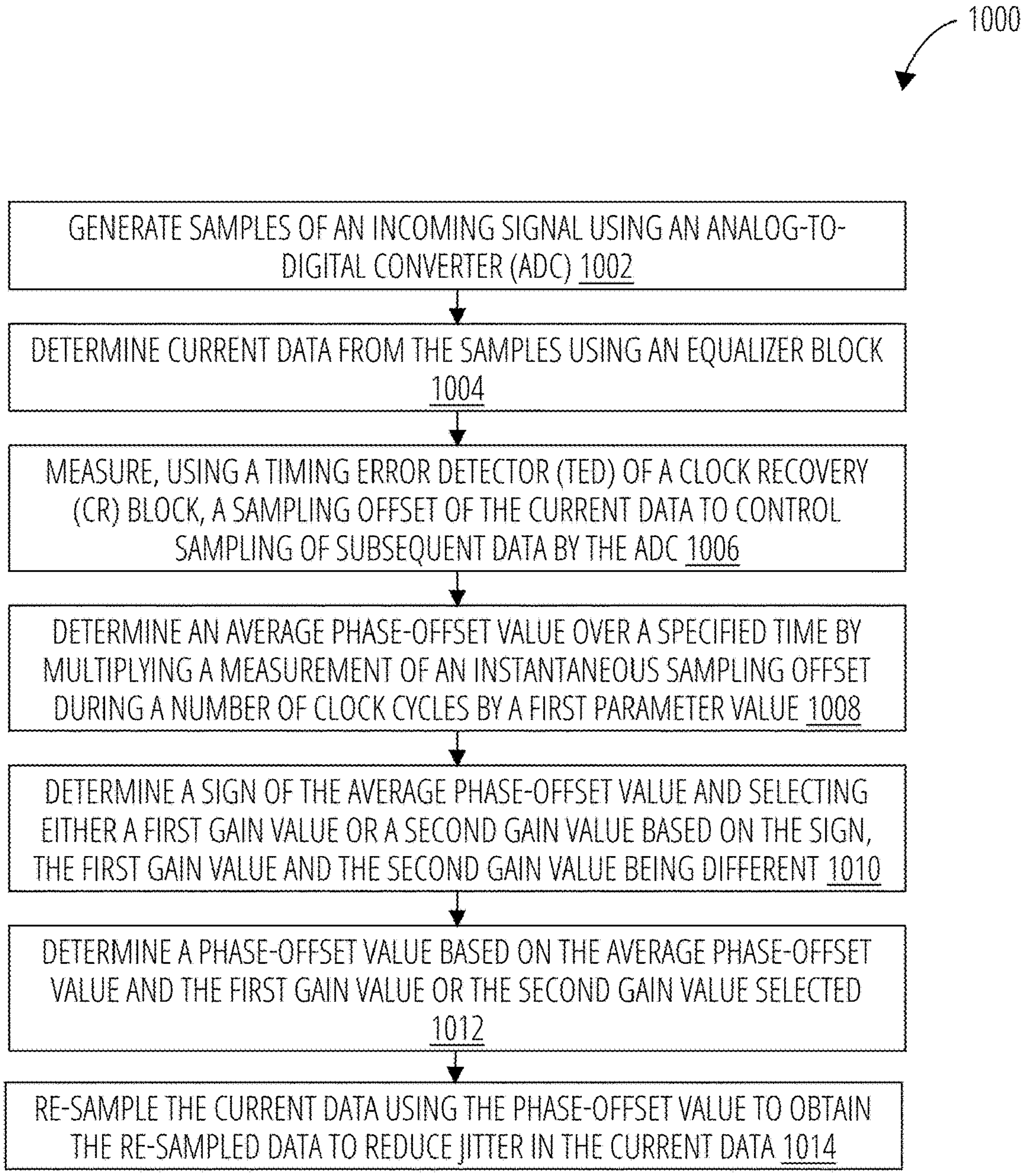
FIG. 10 is a flow diagram of a method for correcting jitter in an incoming signal, in accordance with at least some embodiments.

FIG. 10 is a flow diagram of a method 1000 for correcting jitter in an incoming signal, in accordance with at least some embodiments. The method 1000 can be performed by processing logic comprising hardware, software, firmware, or any combination thereof. In at least one embodiment, the method 1000 is performed by any one of device 110 or device 112 of FIG. 1A to FIG. 1B or the receiver 104 of FIG. 1A to FIG. 1B. In at least one embodiment, the method 1000 is performed by the receiver 200 of FIG. 2. In another embodiment, the method 1000 is performed by SerDes IC 600 of FIG. 6C.

Referring to FIG. 10, the method 1000 begins with the processing logic generating samples of an incoming signal using an analog-to-digital converter (ADC) (block 1002). At block 1004, the processing logic determines current data from the samples using an equalizer block. At block 1006, the processing logic measures, using a timing error detector (TED) of a clock recovery (CR) block, a sampling offset of the current data to control sampling of subsequent data by the ADC. At block 1008, the processing logic determines an average phase-offset value over a specified time by multiplying a measurement of an instantaneous sampling offset during a number of clock cycles by a first parameter value. At block 1010, the processing logic determines a sign of the average phase-offset value and selecting either a first gain value or a second gain value based on the sign, the first gain value and the second gain value being different. At block 1012, the processing logic determines a phase-offset value based on the average phase-offset value and the first gain value or the second gain value selected. At block 1014, the processing logic re-samples the current data using the phase-offset value to obtain the re-sampled data to reduce jitter in the current data.

In at least one embodiment, the processing logic adds a static or semi-static offset value to the phase-offset value to obtain a modified phase-offset value before the re-sampling. In at least one embodiment, the processing logic delays the current data to align the current data with the phase-offset value corresponding to the current data. In at least one embodiment, re-sampling the current data at block 1014 includes re-sampling the current data using a three-tap FIR filter.

Figure 11:
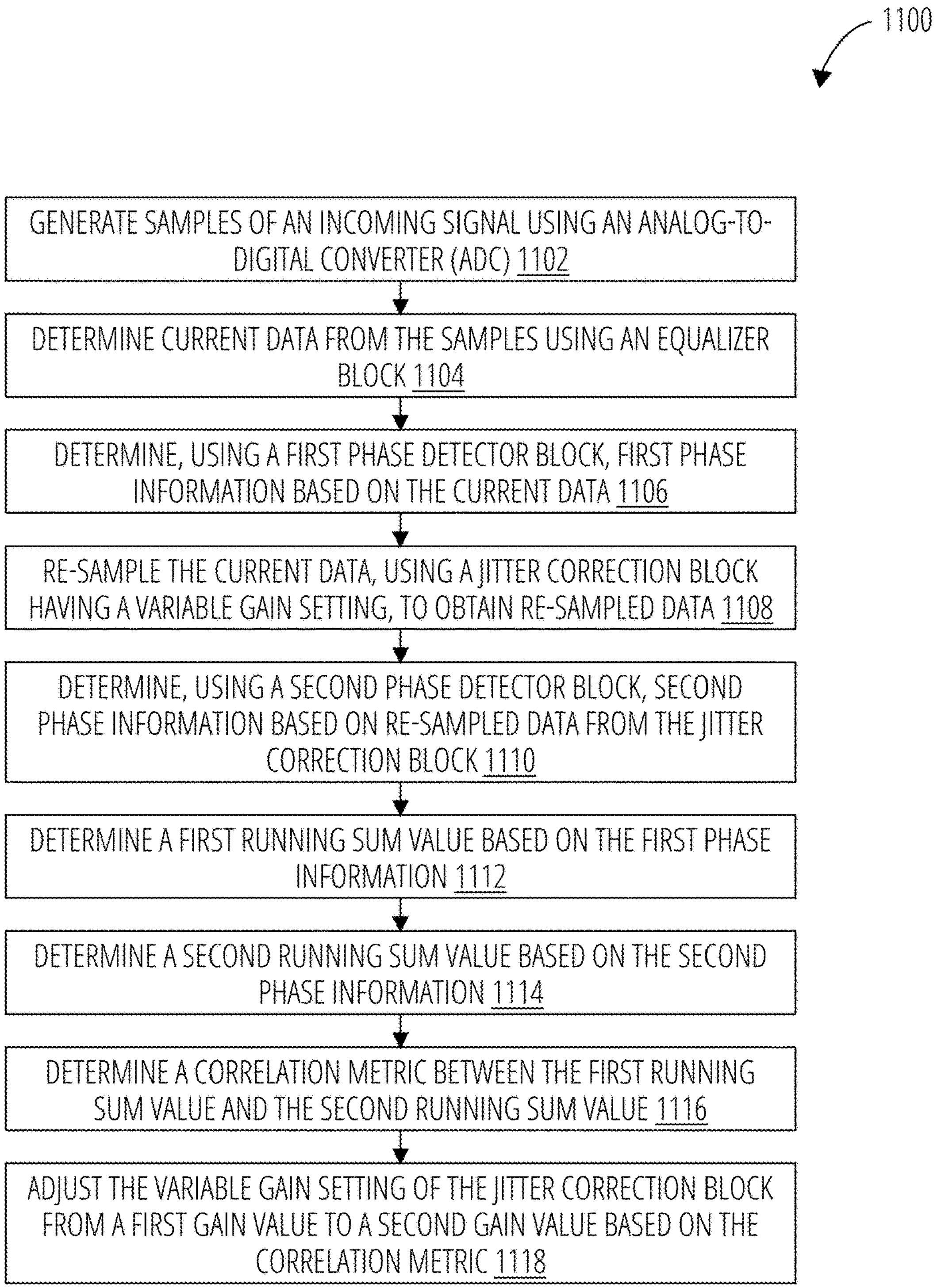
FIG. 11 is a flow diagram of a method for correcting jitter in an incoming signal, in accordance with at least some embodiments.

FIG. 11 is a flow diagram of a method 1100 for correcting jitter in an incoming signal, in accordance with at least some embodiments. The method 1100 can be performed by processing logic comprising hardware, software, firmware, or any combination thereof. In at least one embodiment, the method 1100 is performed by any one of device 110 or device 112 of FIG. 1A to FIG. 1B or the receiver 104 of FIG. 1A to FIG. 1B. In at least one embodiment, the method 1100 is performed by the receiver 200 of FIG. 2. In another embodiment, the method 1100 is performed by SerDes IC 600 of FIG. 6D.

Referring to FIG. 11, the method 1100 begins with the processing logic generating samples of an incoming signal using an analog-to-digital converter (ADC) (block 1102). At block 1104, the processing logic determines current data from the samples using an equalizer block. At block 1106, the processing logic determines, using a first phase detector block, first phase information based on the current data. At block 1108, the processing logic re-samples the current data, using a jitter correction block having a variable gain setting, to obtain re-sampled data. At block 1110, the processing logic determines, using a second phase detector block, second phase information based on re-sampled data from the jitter correction block. At block 1112, the processing logic determines a first running sum value based on the first phase information. At block 1114, the processing logic determines a second running sum value based on the second phase information. At block 1116, the processing logic determines a correlation metric between the first running sum value and the second running sum value. At block 1118, the processing logic adjusts the variable gain setting of the jitter correction block from a first gain value to a second gain value based on the correlation metric.

In at least one embodiment, the second gain value is higher than the first gain value responsive to the correlation metric being a positive number indicating a correlation between the first running sum value and the second running sum value. The second gain value is lower than the first gain value responsive to the correlation metric being a negative number indicating a de-correlation between the first running sum value and the second running sum value. The second gain value is equal to the first gain value responsive to the correlation metric being zero indicating an optimum gain setting.

In at least one embodiment, the processing logic determines the correlation metric at block 1116, the processing logic aligns, using a delay element, the first running sum value and the second running sum value. The processing logic determines a product of the first running sum value and the second running sum value and determining the second gain value, using an integrator with a slope parameter and a bleeder parameter, according to Equation 2, where $g_{n+1}$ represents the second gain value, $g_n$ represents the first gain value, $\alpha$ represents the slope parameter, $\beta$ represents the bleeder parameter, and $C_n$ represents the product of the first running sum value and the second running sum value.

In at least one embodiment, at block 1108, the processing logic receives the current data from the equalizer block and determines a third running sum value based on the first phase information received from the first phase detector block. The processing logic applies the first gain value to the third running sum value to obtain a phase correction value, and re-samples, using the phase correction value, the current data to obtain the re-sampled data. In a further embodiment, after adjusting the variable gain setting from the first gain value to the second gain value, the processing logic receives subsequent data from the equalizer block and determines a fourth running sum value based on third phase information received from the first phase detector block. The processing logic applies the second gain value to the fourth running sum value to obtain a second phase correction value, and re-samples, using the second phase correction value, the subsequent data to obtain the re-sampled subsequent data.

Figure 12:
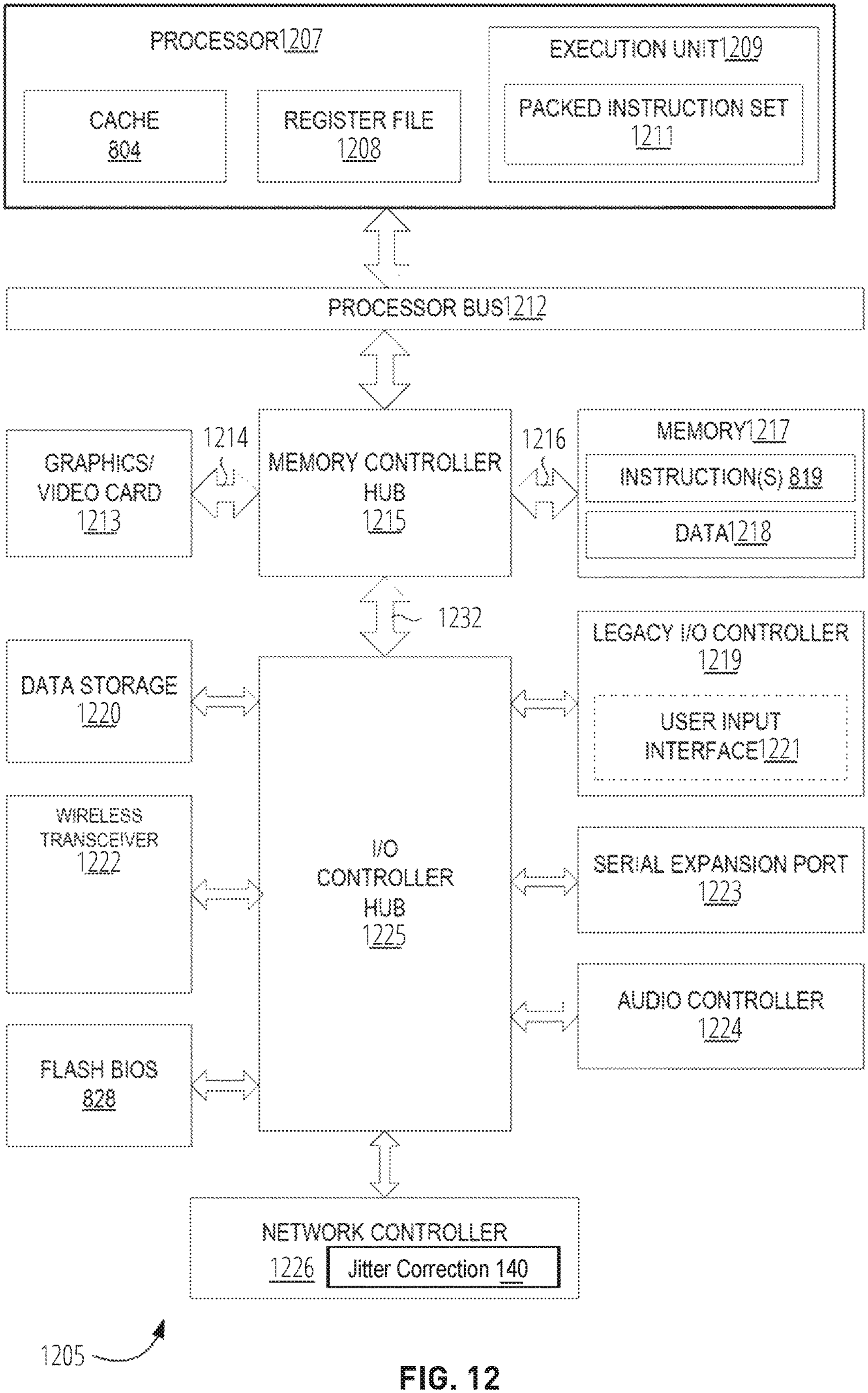
FIG. 12 illustrates an example computer system including a jitter correction block, in accordance with at least some embodiments.

FIG. 12 illustrates an example computer system 1205, including a jitter correction block 140, in accordance with at least some embodiments. In at least one embodiment, computer system 1205 may be a system with interconnected devices and components, an SOC, or some combination. In at least one embodiment, computer system 1205 is formed with a processor 1207 that may include execution units to execute an instruction. In at least one embodiment, computer system 1205 may include, without limitation, a component, such as a processor 1207, to employ execution units including logic to perform algorithms for processing data. In at least one embodiment, computer system 1205 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and the like) may also be used. In at least one embodiment, computer system 1205 may execute a version of WINDOWS® operating system available from Microsoft Corporation of Redmond, Wash., although other operating systems (UNIX and Linux, for example), embedded software, and/or graphical user interfaces, may also be used.

In at least one embodiment, computer system 1205 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 1205 may be used in devices such as graphics processing units (GPUs), network adapters, central processing units, and network devices such as switches (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 1205 may include, without limitation, processor 1207 that may include, without limitation, one or more execution units 1209 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 1205 is a single processor desktop or server system. In at least one embodiment, computer system 1205 may be a multiprocessor system. In at least one embodiment, processor 1207 may include, without limitation, a CISC microprocessor, a RISC microprocessor, a VLIW microprocessor, and a processor implementing a combination of instruction sets, or any other processor device, such as a digital signal processor, for example. In at least one embodiment, processor 1207 may be coupled to a processor bus 1212 that may transmit data signals between processor 1207 and other components in computer system 1205.

In at least one embodiment, processor 1207 may include, without limitation, a Level 1("L1") internal cache memory ("cache") 804. In at least one embodiment, processor 1207 may have a single internal cache or multiple levels of internal cache. In at least one embodiment, cache memory may reside external to processor 1207. In at least one embodiment, processor 1207 may also include a combination of both internal and external caches. In at least one embodiment, a register file 1208 may store different types of data in various registers including, without limitation, integer registers, floating point registers, status registers, and an instruction pointer register.

In at least one embodiment, execution unit 807, including, without limitation, logic to perform integer and floating point operations, also resides in processor 1207. Processor 1207 may also include a microcode ("ucode") read only memory ("ROM") that stores microcode for certain macro instructions. In at least one embodiment, execution unit 807 may include logic to handle a packed instruction set 1211. In at least one embodiment, by including packed instruction set 1211 in an instruction set of a general-purpose processor 1207, along with associated circuitry to execute instructions, operations used by many multimedia applications may be performed using packed data in a general-purpose processor 1207. In at least one embodiment, many multimedia applications may be accelerated and executed more efficiently by using the full width of a processor's data bus for performing operations on packed data, which may eliminate a need to transfer smaller units of data across a processor's data bus to perform one or more operations one data element at a time.

In at least one embodiment, execution unit 1210 may also be used in microcontrollers, embedded processors, graphics devices, DSPs, and other types of logic circuits. In at least one embodiment, computer system 1205 may include, without limitation, a memory 1217. In at least one embodiment, memory 1217 may be implemented as a DRAM device, an SRAM device, a flash memory device, or other memory devices. Memory 1217 may store instruction(s) 819 and/or data 1218 represented by data signals that may be executed by processor 1207.

In at least one embodiment, a system logic chip may be coupled to a processor bus 1212 and memory 1217. In at least one embodiment, the system logic chip may include, without limitation, a memory controller hub ("MCH") 816, and processor 1207 may communicate with MCH 1215 via processor bus 1212. In at least one embodiment, MCH 1215 may provide a high bandwidth memory path 1216 to memory 1217 for instruction and data storage and for storage of graphics commands, data, and textures. In at least one embodiment, MCH 1215 may direct data signals between processor 1207, memory 1217, and other components in computer system 1205 and may bridge data signals between processor bus 1212, memory 1217, and a system I/O 1232. In at least one embodiment, a system logic chip may provide a graphics port for coupling to a graphics controller. In at least one embodiment, MCH 1215 may be coupled to memory 1217 through a high bandwidth memory path 1216, and graphics/video card 1213 may be coupled to MCH 1215 through an Accelerated Graphics Port ("AGP") interconnect 1214.

In at least one embodiment, computer system 1205 may use system I/O 1232 that is a proprietary hub interface bus to couple MCH 1215 to I/O controller hub ("ICH") 830. In at least one embodiment, ICH 1225 may provide direct connections to some I/O devices via a local I/O bus. In at least one embodiment, a local I/O bus may include, without limitation, a high-speed I/O bus for connecting peripherals to memory 1217, a chipset, and processor 1207. Examples may include, without limitation, an audio controller 1224, a firmware hub ("flash BIOS") 828, a wireless transceiver 1222, a data storage 1220, a legacy I/O controller 1219 containing a user input interface 1221 and a keyboard interface, a serial expansion port 1223, such as a USB, and a network controller 1226. In at least one embodiment, the network controller 1226 includes the jitter correction block 140 as described herein. Data storage 1220 may comprise a hard disk drive, a floppy disk drive, a CD-ROM device, a flash memory device, or other mass storage device.

In at least one embodiment, FIG. 12 illustrates a system, which includes interconnected hardware devices or "chips." In at least one embodiment, FIG. 12 may illustrate an example SoC. In at least one embodiment, devices illustrated in FIG. 12 may be interconnected with proprietary interconnects, standardized interconnects (e.g., PCIe), or some combination thereof. In at least one embodiment, one or more components of system 1206 are interconnected using compute express link ("CXL") interconnects.

Figure 13:
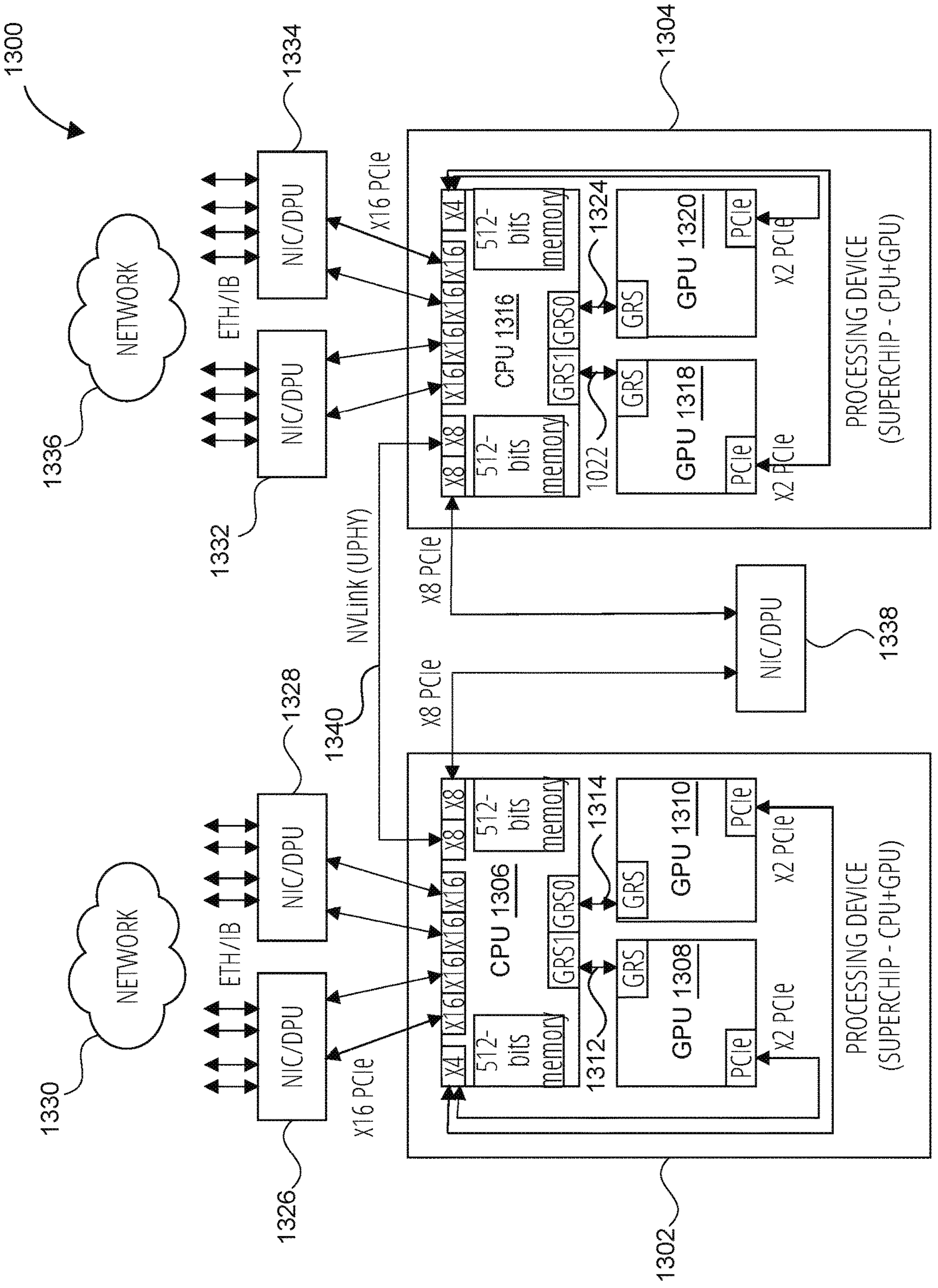
FIG. 13 is a block diagram of a computing system having two processing devices coupled to each other and multiple networks according to at least one embodiment.

FIG. 13 is a block diagram of a computing system 1300 having two processing devices coupled to each other and multiple networks according to at least one embodiment. The computing system 1300 is designed with multiple integrated circuits (referred to as processing devices), where each integrated circuit includes a CPU and two GPUs, forming a powerful and flexible architecture. These processing devices are interconnected via an NVLink (or other high-speed interconnect), enabling high-speed communication between the processing devices, and are also connected through a Network Interface Card (NIC) or Data Processing Unit (DPU) to ensure efficient data transfer across the computing system 1300. The coupling of processing devices through NVLink allows for seamless data exchange and parallel processing, enhancing overall computational performance. Additionally, these processing devices are connected to multiple networks through one or more network interface cards (NICs) or DPUs, enabling the system to handle complex, multi-network tasks with high bandwidth and low latency. This configuration makes the computing system 1300 highly suitable for demanding applications that require significant processing power, such as artificial intelligence (AI), machine learning (ML), and data-intensive computing, while ensuring robust connectivity and scalability across various networked environments. The integrated circuits of the computing system 1300 can include one or more CPUs and one or more GPUs. An example architecture of a multi-GPU architecture is illustrated in FIG. 13.

As illustrated in FIG. 13, the computing system 1300 includes a processing device 1302 with a multi-GPU architecture. In particular, the processing device 1302 includes a CPU 1306, a GPU 1308, and a GPU 1310. The CPU 1306 can be coupled to the GPU 1308 via an die-to-die (D2D) or chip-to-chip (C2C) interconnect 1312, such as a Ground-Referenced Signaling interconnect (GRS interconnect). The CPU 1306 can be coupled to the GPU 1310 via a D2D or C2C interconnect 1314. The CPU 1306 can also couple to the GPU 1308 and GPU 1310 via PCIe interconnects. The CPU 1306 can be coupled to one or more network interface cards (NICs) or data processing units (DPUs), which are coupled to one or more networks. For example, as illustrated in FIG. 13, the CPU 1306 is coupled to a first NIC/DPU 1326, which is coupled to a network 1330. The CPU 1306 is also coupled to a second NIC/DPU 1328, which is coupled to the network 1330. The NIC/DPU 1326 and NIC/DPU 1328 can be coupled to the network 1330 over Ethernet (ETH) or InfiniBand (IB) connections.

The computing system 1300 also includes a processing device 1304 with a multi-GPU architecture. In particular, the processing device 1304 includes a CPU 1316, a GPU 1318, and a GPU 1320. The CPU 1316 can be coupled to the GPU 1318 via an D2D or C2C interconnect 1322. The CPU 1316 can be coupled to the GPU 1320 via a D2D or C2C interconnect 1324. The CPU 1316 can also couple to the GPU 1318 and GPU 1320 via PCIe interconnects. The CPU 1316 can be coupled to one or more NICs or DPUs, which are coupled to one or more networks. For example, as illustrated in FIG. 13, the CPU 1316 is coupled to a first NIC/DPU 1332, which is coupled to a network 1336. The CPU 1316 is also coupled to a second NIC/DPU 1334, which is coupled to the network 1336. The NIC/DPU 1332 and NIC/DPU 1334 can be coupled to the network 1336 over Ethernet (ETH) or InfiniBand (IB) connections.

In at least one embodiment, the processing device 1302 and the processing device 1304 can communication with each other via a NIC/DPU 1338, such as over PCIe interconnects. The processing device 1302 and processing device 1304 can also communicate with each other over a high-bandwidth communication interconnects 1340, such as an NVLink interconnect or other high-speed interconnects.

The computing system 1300 includes various types of interconnects. Each of the interconnects includes the transceivers or receivers that include the jitter correction block 140A (or 140B), as described herein.

In at least one embodiment, the computing system 1300 is used for high-speed network communication and includes a processing unit (e.g., CPU 1306, GPU 1308, GPU 1310, CPU 1316, GPU 1318, GPU 1320, NIC/DPU 1338, NIC/DPU 1326, NIC/DPU 1328, NIC/DPU 1332, or NIC/DPU 1334), and a network interface coupled to the processing unit. The network interface includes a receiver device, which includes an ADC to sample an incoming signal to obtain samples. The receiver device also includes a signal processing circuit coupled to the ADC. The signal processing circuit includes an equalizer block, a phase detector block, and a jitter correction block. The jitter correction block can receive current data from the equalizer block, determine a running sum value based on phase information received from the phase detector block, apply either a first gain value or a second gain value to the running sum value to obtain a phase correction value based on a sign of the running sum value. The first gain value and the second gain value can be different or the same. The jitter correction block can re-sample, using the phase correction value, the current data to obtain re-sampled data to reduce jitter in the current data. In a further embodiment, the jitter correction block can add a static or semi-static offset value to the phase correction value before re-sampling the current data.

In a further embodiment, the jitter correction block includes a running sum block, a gain control block, and a re-sample block. The running sum block can determine the running sum value based on the phase information received from the phase detector block. The gain control block can receive the running sum value, determine the sign of the running sum value, select either the first gain value or the second gain value based on the sign, and apply either the first gain value or the second gain value selected to the running sum value to obtain the phase correction value. The re-sample block can receive the current data from the equalizer block and re-sample, using the phase correction value, the current data to obtain the re-sampled data to reduce jitter in the current data. In a further embodiment, the jitter correction block further includes an offset control block to add a static or semi-static offset value to the phase correction value to obtain a modified phase correction value. The re-sample block can use the modified phase correction value to re-sample the current data to obtain the re-sampled data.

In at least one embodiment, the computing system 1300 is used for high-speed network communication and includes a processing unit (e.g., CPU 1306, GPU 1308, GPU 1310, CPU 1316, GPU 1318, GPU 1320, NIC/DPU 1338, NIC/DPU 1326, NIC/DPU 1328, NIC/DPU 1332, or NIC/DPU 1334), and a network interface coupled to the processing unit. The network interface includes a receiver device, which includes an ADC to sample an incoming signal to obtain samples; and a signal processing circuit coupled to the ADC. The signal processing circuit includes a jitter correction block, an equalizer block to generate current data, a first phase detector block to determine first phase information based on the current data, and a gain control block comprising a second phase detector block to determine second phase information based on re-sampled data from the jitter correction block. The gain control block can determine a first running sum value based on the first phase information. The gain control block can determine a second running sum value based on the second phase information. The gain control block can determine a correlation metric between the first running sum value and the second running sum value. The gain control block can adjust a variable gain setting of the jitter correction block from a first gain value to a second gain value based on the correlation metric. The second gain value is higher than the first gain value responsive to the correlation metric being a positive number indicating a correlation between the first running sum value and the second running sum value. The second gain value is lower than the first gain value responsive to the correlation metric being a negative number indicating a de-correlation between the first running sum value and the second running sum value. The second gain value is equal to the first gain value responsive to the correlation metric being zero indicating an optimum gain setting.

Figure 14:
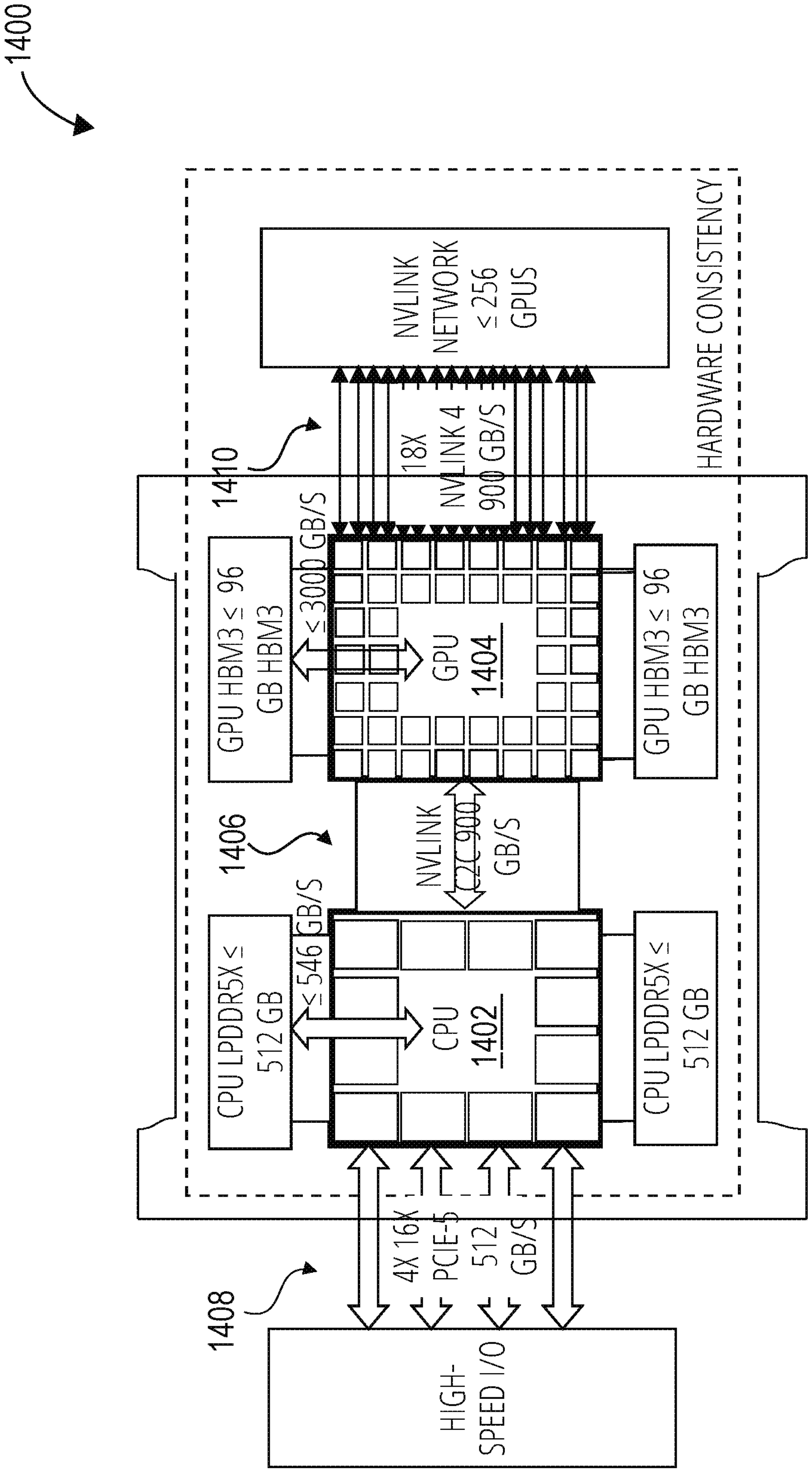
FIG. 14 is a block diagram of a computing system having a central processing unit (CPU) and a graphics processing unit (GPU) in a single integrated circuit according to at least one embodiment.

FIG. 14 is a block diagram of a computing system 1400 having a CPU 1402 and a GPU 1404 in a single integrated circuit according to at least one embodiment. The computing system 1400 can be a highly integrated design where a CPU 1402 and GPU 1404 are connected on a single integrated circuit, utilizing an NVLink C2C (Chip-to-Chip) interconnect 1406 to enable fast, low-latency communication between the two processing units. This close integration allows for efficient data transfer and parallel processing between the CPU 1402 and GPU 1404, optimizing performance for complex computational tasks. The GPU elements within the computing system 1400 can be interconnected using an NVLink network, allowing for scalability up to 256 GPU elements, creating a powerful, unified processing environment ideal for large-scale AI, ML, and high-performance computing applications. The NVLink network can be a GPU fabric of high-bandwidth communication interconnects 1410. Additionally, the computing system 1400 can be designed to interface with a high-speed I/O through PCIe interconnects 1408, ensuring rapid data transfer to and from external devices, further enhancing the system's capabilities in handling data-intensive tasks and providing robust connectivity to peripheral components. It should be noted that the C2C interconnects 1406 can be considered D2D interconnects since the CPU 1402 and the GPU 1404 are located on the same integrated circuit. The integrated circuit can include CPU memory (also referred to as main memory) and GPU memory, which are accessible by the CPU 1402 and the GPU 1404, respectively, over high-speed interconnects. The computing system 1400 can bring together performance of the GPU 1404 with the versatility of the CPU 1402. The CPU 1402 can be connected with a high-bandwidth and memory coherent C2C interconnects 1406 in a single integrated circuit. The computing system 1400 can support a link switch system.

The computing system 1400 includes various types of interconnects. Each of the interconnects includes the transceivers or receivers that include the jitter correction block 140A (or 140B), as described herein.

In at least one embodiment, the computing system 1400 is used for high-speed network communication and includes a processing unit (e.g., CPU 1402, GPU 1404, NVLink network), and a network interface coupled to the processing unit. The network interface can include the receiver device as described above with respect to FIG. 13.

Figure 15:
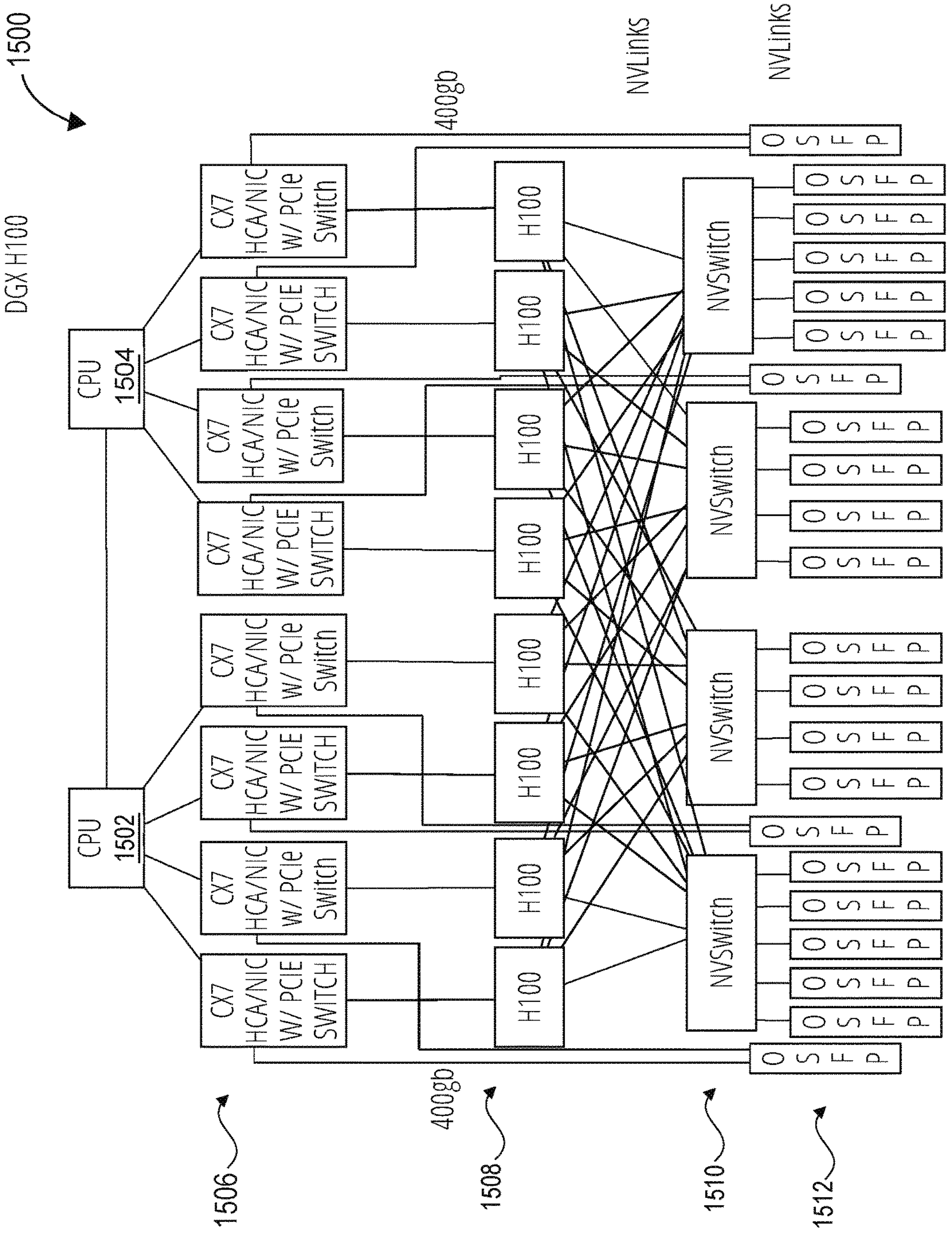
FIG. 15 is a block diagram of a computing system having tensor core graphics processing units (GPUs) according to at least one embodiment.

FIG. 15 is a block diagram of a computing system 1500 having tensor core GPUs 1508 according to at least one embodiment. The computing system 1500 can be a DGX H100 system, which is a high-performance computing platform designed to meet the demands of AI, ML, and deep learning (DL) workloads. The computing system 1500 can include multiple tensor core GPUs 1508 (e.g., NVIDIA H100 Tensor Core GPUs). The tensor core GPUs 1508 can each be one of the integrated circuits described above with respect to FIG. 14. The tensor core GPUs 1508 can be optimized for AI/ML/DL applications, offering exceptional performance for deep learning training, inference, and high-performance computing tasks. The tensor core GPUs 1508 within the computing system 1500 are interconnected using high-speed communication interfaces like NVLinks, enabling rapid data transfer between them, which is crucial for handling large-scale AI models and datasets with low latency. This computing system 1500 is designed for scalability, allowing for the integration of additional GPUs as required, making it versatile enough for research, development, and deployment in data centers for production AI workloads. Each GPU is equipped with Tensor Cores, specialized processing units that accelerate matrix operations, a fundamental component of AI and deep learning algorithms. These Tensor Cores enable the system to perform mixed-precision calculations efficiently, balancing speed and accuracy. Given the power consumption and heat generation of multiple tensor core GPUs 1508, the computing system 1500 can include advanced cooling solutions and power management features to ensure safe operation while maintaining peak performance. It is supported by a comprehensive software ecosystem, including NVIDIA's CUDA programming model, AI frameworks like TensorFlow and PyTorch, and other HPC and AI software tools, which enable developers and researchers to harness the full power of the tensor core GPUs 1508 for their specific applications. The computing system 1500 is ideally suited for large-scale AI model training, real-time inference, scientific simulations, data analytics, and other compute-intensive tasks that require massive parallel processing power.

The tensor core GPUs 1508 can be coupled to multiple CPUs, such as CPU 1502 and CPU 1504, using switches 1506 (e.g., CX7 HCA/NIC with PCIe switch). The tensor core GPUs 1508 can be coupled to each other via switches 1510 (e.g., NVSwitches). The switches 1506 and switches 1510 can be coupled to high-speed transceiver modules 1512. The high-speed transceiver modules 1512 can be Octal Small Form-factor Pluggable (OSFP) modules. OSFP modules refer to high-speed transceiver modules designed for rapid data communication, particularly in environments requiring significant bandwidth, such as data centers and high-performance computing systems. These modules support extremely high data rates, typically up to 400 Gbps per module, with future capabilities extending to 800 Gbps or more. OSFP modules interface with the system via the PCIe interface, enabling fast and efficient data transfer between the integrated CPU-GPU components and external networks or other connected systems. Their hot-pluggable nature allows for easy insertion or removal without the need to power down the system, offering flexibility and ease of maintenance, which is crucial in critical-uptime environments. Additionally, OSFP modules are designed for high density, maximizing the number of high-speed connections within limited space, such as in densely packed server racks. By adhering to the latest networking standards, OSFP modules ensure the computing system 1500 remains capable of meeting increasing data demands and can be upgraded to support future advancements in network speeds, thus contributing to the system's overall performance and scalability.

In at least one embodiment, the computing system 1500 can be considered a data-network configuration with full-bandwidth intra-server NVLinks. In this example, all eight tensor core GPUs 1508 can simultaneously saturate eighteen NVLinks to other GPUs within the server. The bandwidth is limited by over-subscription from multiple other GPUs. In another embodiments, data-network configuration can be a half-bandwidth intra-server NVLinks. In this example, all eight tensor core GPUs 1508 can half-subscribe eighteen NVLinks to GPUs in other servers. Four tensor core GPUs 1508 can saturate eighteen NVLinks to GPUs in other servers. This is equivalent of full-bandwidth on AllReduce with Scalable Hierarchical Aggregation and Reduction Protocol (SHARP). The reduction in all-2-all (All2All) bandwidth is a balance with server complexity and costs. In at least one embodiment, all eight tensor core GPUs 1508 can independently transfer data, using Remote Direct Memory Access (RDMA) protocol, over its own dedicated switch (e.g., 400 Gb/s HCA/NIC) in an multi-rail InfiniBand/Ethernet configuration. In this example, 800 GBps of aggregate full-duplex to non-NVLink network devices.

The computing system 1500 includes various types of interconnects. Each of the interconnects includes the transceivers or receivers that include the jitter correction block 140A (or 140B), as described herein. In at least one embodiment, the computing system 1500 is used for high-speed network communication and includes a processing unit (e.g., CPU 1502, CPU 1504, switches 1506, tensor core GPUs 1508, switches 1510, high-speed transceiver modules 1512), and a network interface coupled to the processing unit. The network interface can include the receiver device as described above with respect to FIG. 13. The processing unit can include a CPU, a GPU, a DPU, a network adapter, a network switch, an NVLink switch, or the like.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is understood within the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure, and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still cooperate or interact with each other.

Unless specifically stated otherwise, it may be appreciated that throughout the specification, terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers, or other such information storage, transmission, or display devices.

In a similar manner, the term "processor" may refer to any device or portion of a device that processes electronic data from registers and/or memory and transforms that electronic data into other electronic data that may be stored in registers and/or memory. As a non-limiting example, a "processor" may be a network device. A "computing platform" may comprise one or more processors. As used herein, "software" processes may include, for example, software and/or hardware entities that perform work over time, such as tasks, threads, and intelligent agents. Also, each process may refer to multiple processes for continuously or intermittently carrying out instructions in sequence or in parallel. In at least one embodiment, the terms "system" and "method" are used herein interchangeably insofar as the system may embody one or more methods and the methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from a providing entity to an acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that the subject matter claimed in the appended claims is not necessarily limited to the specific features or acts described. Rather, the specific features and acts are disclosed as exemplary forms of implementing the claims.

What is claimed is:

1. A receiver device comprising:

an analog-to-digital converter (ADC) configured to sample an incoming signal to obtain samples; and a signal processing circuit coupled to the ADC, wherein the signal processing circuit comprises a jitter correction block, an equalizer block configured to generate current data, a first phase detector block configured to determine first phase information based on the current data, and a gain control block comprising a second phase detector block configured to determine second phase information based on re-sampled data from the jitter correction block, wherein the gain control block is configured to:

determine a first running sum value based on the first phase information;

determine a second running sum value based on the second phase information;

determine a correlation metric between the first running sum value and the second running sum value; and adjust a variable gain setting of the jitter correction block from a first gain value to a second gain value based on the correlation metric.

2. The receiver device of claim 1, wherein the second gain value is higher than the first gain value responsive to the correlation metric being a positive number indicating a correlation between the first running sum value and the second running sum value, wherein the second gain value is lower than the first gain value responsive to the correlation metric being a negative number indicating a de-correlation between the first running sum value and the second running sum value, and wherein the second gain value is equal to the first gain value responsive to the correlation metric being zero indicating an optimum gain setting.

3. The receiver device of claim 1, wherein the gain control block is configured to determine the correlation metric as an accumulated product (F) of the first running sum value and the second running sum value.

4. The receiver device of claim 3, wherein the gain control block further comprises a delay element configured to align the first running sum value and the second running sum value before determining the accumulated product.

5. The receiver device of claim 3, wherein the gain control block further comprises an integrator with a slope parameter and a bleeder parameter, wherein the integrator is configured to determine the second gain value using the following equation:

$$9_{n+1} = 9_n + \alpha^* C_n - \beta,$$

Where $g_{n+1}$ represents the second gain value, $g_n$ represents the first gain value, a represents the slope parameter, ß represents the bleeder parameter, and $C_n$ represents a product of the first running sum value and the second running sum value.

6. The receiver device of claim 3, wherein the gain control block further comprises an error calculator block, the error calculator block configured to receive the re-sampled data and generate error information, wherein the second phase detector block is configured to determine the second phase information using the error information.

7. The receiver device of claim 1, wherein the jitter correction block is configured to:

receive the current data from the equalizer block;

determine a third running sum value based on the first phase information received from the first phase detector block;

apply the first gain value to the third running sum value to obtain a phase correction value; and re-sample, using the phase correction value, the current data to obtain the re-sampled data to reduce jitter in the current data.

8. The receiver device of claim 7, wherein the jitter correction block, after adjusting the variable gain setting from the first gain value to the second gain value, is further configured to:

receive subsequent data from the equalizer block;

determine a fourth running sum value based on third phase information received from the first phase detector block;

apply the second gain value to the fourth running sum value to obtain a second phase correction value; and re-sample, using the second phase correction value, the subsequent data to obtain the re-sampled subsequent data.

9. A method comprising:

generating samples of an incoming signal using an analog-to-digital converter (ADC);

determining current data from the samples using an equalizer block;

determining, using a first phase detector block, first phase information based on the current data;

re-sampling the current data, using a jitter correction block having a variable gain setting, to obtain re-sampled data;

determining, using a second phase detector block, second phase information based on the re-sampled data from the jitter correction block;

determining a first running sum value based on the first phase information;

determining a second running sum value based on the second phase information;

determining a correlation metric between the first running sum value and the second running sum value; and adjusting the variable gain setting of the jitter correction block from a first gain value to a second gain value based on the correlation metric.

10. The method of claim 9, wherein the second gain value is higher than the first gain value responsive to the correlation metric being a positive number indicating a correlation between the first running sum value and the second running sum value, wherein the second gain value is lower than the first gain value responsive to the correlation metric being a negative number indicating a de-correlation between the first running sum value and the second running sum value, and wherein the second gain value is equal to the first gain value responsive to the correlation metric being zero indicating an optimum gain setting.

11. The method of claim 9, wherein determining the correlation metric comprises:

aligning, using a delay element, the first running sum value and the second running sum value;

determining a product of the first running sum value and the second running sum value; and determining the second gain value, using an integrator with a slope parameter and a bleeder parameter, according to the following equation:

$$9_{n+1} = 9_n + \alpha^* C_n - \beta,$$

Where $g_{n+1}$ represents the second gain value, $g_n$ represents the first gain value, a represents the slope parameter, ß represents the bleeder parameter, and $C_n$ represents a product of the first running sum value and the second running sum value.

12. The method of claim 9, wherein re-sampling the current data, using the jitter correction block having the variable gain setting, to obtain the re-sampled data comprises:

receiving the current data from the equalizer block;

determining a third running sum value based on the first phase information received from the first phase detector block;

applying the first gain value to the third running sum value to obtain a phase correction value; and re-sampling, using the phase correction value, the current data to obtain the re-sampled data;

wherein, after adjusting the variable gain setting from the first gain value to the second gain value, the method further comprises:

receiving subsequent data from the equalizer block;

determining a fourth running sum value based on third phase information received from the first phase detector block;

applying the second gain value to the fourth running sum value to obtain a second phase correction value; and re-sampling, using the second phase correction value, the subsequent data to obtain the re-sampled subsequent data.

13. A system for high-speed network communication, the system comprising:

a processing unit; and a network interface coupled to the processing unit, wherein the network interface comprises a receiver device, wherein the receiver device comprises:

an analog-to-digital converter (ADC) configured to sample an incoming signal to obtain samples; and a signal processing circuit coupled to the ADC, wherein the signal processing circuit comprises a jitter correction block, an equalizer block configured to generate current data, a first phase detector block configured to determine first phase information based on the current data, and a gain control block comprising a second phase detector block configured to determine second phase information based on re-sampled data from the jitter correction block, wherein the gain control block is configured to:

determine a first running sum value based on the first phase information;

determine a second running sum value based on the second phase information;

determine a correlation metric between the first running sum value and the second running sum value; and adjust a variable gain setting of the jitter correction block from a first gain value to a second gain value based on the correlation metric.

14. The system of claim 13, wherein the second gain value is higher than the first gain value responsive to the correlation metric being a positive number indicating a correlation between the first running sum value and the second running sum value, wherein the second gain value is lower than the first gain value responsive to the correlation metric being a negative number indicating a de-correlation between the first running sum value and the second running sum value, and wherein the second gain value is equal to the first gain value responsive to the correlation metric being zero indicating an optimum gain setting.

15. A data center system comprising:

a plurality of computing devices interconnected via a communication network; and a network interface device coupled to at least one of the plurality of computing devices, wherein the network interface device comprises a receiver device, wherein the receiver device comprises:

an analog-to-digital converter (ADC) configured to sample an incoming signal to obtain samples; and a signal processing circuit coupled to the ADC, wherein the signal processing circuit comprises a jitter correction block, an equalizer block configured to generate current data, a first phase detector block configured to determine first phase information based on the current data, and a gain control block comprising a second phase detector block configured to determine second phase information based on re-sampled data from the jitter correction block, wherein the gain control block is configured to:

determine a first running sum value based on the first phase information;

determine a second running sum value based on the second phase information;

determine a correlation metric between the first running sum value and the second running sum value; and adjust a variable gain setting of the jitter correction block from a first gain value to a second gain value based on the correlation metric.

16. The data center system of claim 15, wherein the second gain value is higher than the first gain value responsive to the correlation metric being a positive number indicating a correlation between the first running sum value and the second running sum value, wherein the second gain value is lower than the first gain value responsive to the correlation metric being a negative number indicating a de-correlation between the first running sum value and the second running sum value, and wherein the second gain value is equal to the first gain value responsive to the correlation metric being zero indicating an optimum gain setting.

17. The data center system of claim 15, wherein the gain control block is configured to determine the correlation metric as an accumulated product (F) of the first running sum value and the second running sum value.

18. The data center system of claim 17, wherein the gain control block further comprises a delay element configured to align the first running sum value and the second running sum value before determining the accumulated product.

19. The data center system of claim 17, wherein the gain control block further comprises an integrator with a slope parameter and a bleeder parameter, wherein the integrator is configured to determine the second gain value using the following equation:

$$g_{n+1} = g_n + \alpha^* C_n - \beta,$$

Where $g_{n+1}$ represents the second gain value, $g_n$ represents the first gain value, a represents the slope parameter, ß represents the bleeder parameter, and $C_n$ represents a product of the first running sum value and the second running sum value.

20. The data center system of claim 15, wherein the gain control block further comprises an error calculator block, the error calculator block configured to receive the re-sampled data and generate error information, wherein the second phase detector block is configured to determine the second phase information using the error information.

21. The data center system of claim 15, wherein the network interface device further comprises a network interface card (NIC) or a data processing unit (DPU).

22. The data center system of claim 15, wherein the plurality of computing devices is interconnected via a high-speed interconnect, and wherein the communication network comprises at least one of an Ethernet network or an InfiniBand network.

* * * * *